US011902805B2

(12) United States Patent
Li

(10) Patent No.: US 11,902,805 B2
(45) Date of Patent: Feb. 13, 2024

(54) COMMUNICATION METHOD AND COMMUNICATIONS APPARATUS

(71) Applicant: HUAWEI TECHNOLOGIES CO., LTD., Shenzhen (CN)

(72) Inventor: Zhuoming Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 421 days.

(21) Appl. No.: 17/203,409

(22) Filed: Mar. 16, 2021

(65) Prior Publication Data

US 2021/0204154 A1    Jul. 1, 2021

Related U.S. Application Data

(63) Continuation of application No. PCT/CN2019/098152, filed on Jul. 29, 2019.

(30) Foreign Application Priority Data

Sep. 17, 2018 (CN) .......................... 201811084387.8

(51) Int. Cl.
*H04W 24/08* (2009.01)
*H04L 41/5019* (2022.01)
(Continued)

(52) U.S. Cl.
CPC ......... *H04W 24/08* (2013.01); *H04L 41/5019* (2013.01); *H04W 24/02* (2013.01); *H04W 24/10* (2013.01)

(58) Field of Classification Search
CPC . H04W 74/0833; H04W 24/08; H04W 64/00; H04W 36/30; H04W 36/24; H04L 43/16
See application file for complete search history.

(56) References Cited

U.S. PATENT DOCUMENTS

2018/0139107 A1    5/2018  Senarath et al.
2019/0174498 A1*   6/2019  Samdanis ......... H04W 72/0453
(Continued)

FOREIGN PATENT DOCUMENTS

CN    107566145 A    1/2018
CN    108235343 A    6/2018
(Continued)

OTHER PUBLICATIONS

3GPP TR 23.791 V1.0.0 (Sep. 2018); 3rd Generation Partnership Project; Technical Specification Group Services and System Aspects; Study of Enablers for Network Automation for 5G; (Release 16) (Year: 2018).*

(Continued)

*Primary Examiner* — Mohammed S Chowdhury
(74) *Attorney, Agent, or Firm* — HAUPTMAN HAM, LLP

(57) ABSTRACT

This application discloses a communication method and a communications apparatus, and relates to the communications field. The communication method includes: obtaining, by a network data analytics function network element, an application information target value of a network slice in a specified location area; obtaining, by the network data analytics function network element, a network running information target value of the network slice in the specified location area based on an association relationship between application information and network running information and the application information target value, where the association relationship is used to describe an association relationship between application information and network running information when a communications service provided by the network slice in the specified location area meets a service level agreement SLA; and sending, by the network data analytics function network element, the net- (Continued)

work running information target value to an operation, administration, and maintenance server.

20 Claims, 11 Drawing Sheets

(51) Int. Cl.
*H04W 24/02* (2009.01)
*H04W 24/10* (2009.01)

(56) References Cited

U.S. PATENT DOCUMENTS

| | | | |
|---|---|---|---|
| 2020/0045559 A1* | 2/2020 | Kim | H04W 28/0268 |
| 2021/0250251 A1* | 8/2021 | Fan | H04L 41/14 |
| 2021/0306887 A1* | 9/2021 | Kim | H04W 24/08 |
| 2021/0329485 A1* | 10/2021 | Han | H04W 28/0236 |
| 2021/0337555 A1* | 10/2021 | Fan | H04W 72/543 |

FOREIGN PATENT DOCUMENTS

| | | |
|---|---|---|
| CN | 108377530 A | 8/2018 |
| WO | 2017168112 A1 | 10/2017 |

OTHER PUBLICATIONS

Huawei et al., "Solution for Key Issue 4 to help OAM perform Slice Resource Adjustment",SA WG2 Meeting #128bis S2-188266,Aug. 20-24, 2018, Sophia Antipolis, France,Total 6 Pages.

3GPP TS 22.261 V16.4.0 (Jun. 2018);3rd Generation Partnership Project;Technical Specification Group Services and System Aspects;Service requirements for the 5G system;Stage 1(Release 16),total 55 pages.

3GPP TR 23.791 V1.0.0:"3rd Generation Partnership Project;Technical Specification Group Services and System Aspects;Study of Enablers for Network Automation for 5G(Release 16)",Sep. 2018,total 66 pages.

[3GPP-28530] 3GPP TS 28.530 V2.0.0 Management of 5G networks and network slicing; Concepts, use cases and requirements, (Sep. 2018),total 31 pages.

3GPP TS 28.531 V2.0.0 (Sep. 2018);3rd Generation Partnership Project;Technical Specification Group Services and System Aspects;Management and orchestration;Provisioning;(Release 15);Total 61 Pages.

3GPP TS 28.532 V1.0.0 (Sep. 2018);3rd Generation Partnership Project;Technical Specification Group Services and System Aspects;Management and orchestration;Generic management services;(Release 15);TotaL 138 Pages.

3GPP TS 28.553 V0.4.0 (Jul. 2018)3rd Generation Partnership Project;;Technical Specification Group Services and System Aspects;Management and orchestration of networks and network slicing;5G Core Network (5GC) performance measurements and assurance data(Release 15),total 14 pages.

3GPP TS 28.554 V2.0.0 (Sep. 2018);3rd Generation Partnership Project;Technical Specification Group Services and System Aspects;Telecommunication management;Management and orchestration;5G end to end Key Performance Indicators (KPI) (Release 15);Total 15 Pages.

Chinese Office Action issued in corresponding Chinese Application No. 201811084387.8, dated Aug. 31, 2020, pp. 1-8.

International Search Report issued in corresponding International Application No. PCT/CN2019/098152, dated Oct. 22, 2019, pp. 1-9.

Chinese Office Action issued in corresponding Chinese Application No. 202110761614.1, dated Mar. 3, 2022, pp. 1-9.

* cited by examiner

COMMUNICATION METHOD AND COMMUNICATIONS APPARATUS

CROSS-REFERENCE TO RELATED APPLICATIONS

This application is a continuation of International Application No. PCT/CN2019/098152, filed on Jul. 29, 2019, which claims priority to Chinese Patent Application No. 201811084387.8, filed on Sep. 17, 2018. The disclosures of the aforementioned applications are hereby incorporated by reference in their entireties.

TECHNICAL FIELD

This application relates to the communications field, and in particular, to a communication method and a communications apparatus.

BACKGROUND

In a 5th generation (5G) mobile communications technology, network slicing (network slice) is a key technology that meets a network differentiation requirement, and is a key feature of network functions virtualization (NFV) and a software defined network (SDN) that are used in a 5G communications network.

Based on a tenant order and a network slice template, an operator creates, on a physical infrastructure of a communications network for a tenant, a relatively isolated logical network that has a specific network feature and that supports a specific service capability. The isolated logical network is referred to as a network slice instance (NSI). The tenant can provide various differentiated application services for a vertical industry or a common user through a communications service provided by a network slice. The tenant that subscribes to the network slice sends a network slice requirement to a network slice management function (NSMF) network element by using a communications service management function (CSMF) network element, and the NSMF network element creates the network slice instance based on the requirement. The NSMF network element decomposes the network slice requirement into network slice subnet requirements, and invokes a network slice subnet management function (NSSMF) network element to create a network slice subnet instance. If a network function (NF) network element is implemented by using a virtualized network function (VNF) network element, the NSSMF network element determines, based on the network slice subnet requirement and the network slice template, a parameter of a network service descriptor (NSD) deployed by the NFV network element, and invokes a management and orchestration (MANO) network element to allocate a virtual resource to the VNF network element and deploys the VNF network element on the virtual resource.

In the prior art, the operator sets a performance capacity and configuration data of the network slice and a performance capacity and configuration data of an NF network element in the network slice in a man-machine interaction manner, that is, sets a network running information target value. Then, the NSMF network element and the NSSMF network element create the network slice, deploy the NF network element in the network slice, allocate the virtual network resource to the NF network element based on the performance capacity, and configure the NF network element based on the configuration data, so that the network slice can provide a communications service specified by the tenant, to support the vertical industry or the common user in using a corresponding application service by using the network slice.

However, in the man-machine interaction manner, a latency is long, and a dynamic change of a service feature or a performance requirement of the application service cannot be responded to in a timely manner.

SUMMARY

Embodiments of this application provide a communication method and a communications apparatus, to dynamically adjust a network running information target value, and respond, in a timely manner, a dynamic change of a service feature or a performance requirement of an application service.

To achieve the foregoing objective, the following technical solutions are used in the embodiments of this application.

According to a first aspect, a communication method is provided. The communication method includes: A network data analytics function network element obtains an application information target value of a network slice in a specified location area. The network data analytics function network element obtains a network running information target value of the network slice in the specified location area based on an association relationship between application information and network running information and the application information target value. The association relationship is used to describe an association relationship between application information and network running information when a communications service provided by the network slice in the specified location area meets a service level agreement SLA. The network data analytics function network element sends the network running information target value to an operation, administration, and maintenance server. In the communication method, the NWDAF network element obtains the application information target value of the network slice in the specified location area, obtains the network running information target value of the network slice in the specified location area based on the association relationship between the application information and the network running information and the application information target value, and sends the network running information target value to the OAM server, to dynamically adjust the network running information target value, and respond, in a timely manner, a dynamic change of a service feature or a performance requirement of an application service.

In a possible implementation, the application information target value includes an application parameter target value, and the network running information target value includes a network parameter target value; the application information target value includes an application parameter target value, and the network running information target value includes a network key performance indicator KPI target value; or the application information target value includes an application service volume target value, and the network running information target value includes a network KPI target value. In this implementation, several specific manners of the application information target value and the network running information target value are provided.

In a possible implementation, that a network data analytics function network element obtains an application information target value of a network slice in a specified location area includes: The network data analytics function network element receives the application information target value from the operation, administration, and maintenance server or an application function network element. In this implementation, a specific manner of how the network data analytics function network element obtains the application information target value is provided.

In a possible implementation, that a network data analytics function network element obtains an application information target value of a network slice in a specified location area includes: The network data analytics function network element receives, from an application function network element, prediction information of a movement track of a terminal device and prediction information of an application parameter. The prediction information of the application parameter is used to predict a mobility pattern and/or a communication pattern used by the terminal device. The network data analytics function network element obtains the application information target value based on the prediction information of the movement track of the terminal device and the prediction information of the application parameter. In this implementation, another specific manner of how the network data analytics function network element obtains the application information target value is provided.

In a possible implementation, the communication method further includes: The network data analytics function network element determines the association relationship based on the application information and the network running information that correspond to the communications service that meets the SLA and that is provided by the network slice in the specified location area. In this implementation, how the network data analytic function network element determines the association relationship is provided.

In a possible implementation, the communication method further includes: The network data analytics function network element receives application experience of the network slice in the specified location area from an application function network element. The network data analytics function network element determines, based on the application experience, the communications service that meets the SLA. In this implementation, how to determine the communications service that meets the SLA by the network data analytics function network element is provided.

In a possible implementation, the communication method further includes: The network data analytics function network element receives, from the application function network element, an application parameter that corresponds to the communications service that meets the SLA and that is provided by the network slice in the specified location area. The network data analytics function network element receives, from a network function network element in the network slice, a network parameter that corresponds to the communications service that meets the SLA and that is provided by the network slice in the specified location area. That the network data analytics function network element determines the association relationship based on the application information and the network running information that correspond to the communications service that meets the SLA and that is provided by the network slice in the specified location area includes: The network data analytics function network element determines the association relationship based on the application parameter and the network parameter. In this implementation, a specific manner of how the network data analytic function network element determines the association relationship is provided.

In a possible implementation, the communication method further includes: The network data analytics function network element receives, from the application function network element, an application service volume of the communications service that meets the SLA and that is provided by the network slice in the specified location area. The network data analytics function network element receives, from the operation, administration, and maintenance server, a network KPI of the communications service that meets the SLA and that is provided by the network slice in the specified location area. That the network data analytics function network element determines the association relationship based on the application information and the network running information that correspond to the communications service that meets the SLA and that is provided by the network slice in the specified location area includes: The network data analytics function network element determines the association relationship based on the application service volume and the network KPI. In this implementation, another specific manner of how the network data analytics function network element determines the association relationship is provided.

In a possible implementation, the communication method further includes: The network data analytics function network element receives, from the application function network element, an application parameter of the communications service that meets the SLA and that is provided by the network slice in the specified location area. The network data analytics function network element receives, from the operation, administration, and maintenance server, a network KPI of the communications service that meets the SLA and that is provided by the network slice in the specified location area. That the network data analytics function network element determines the association relationship based on the application information and the network running information that correspond to the communications service that meets the SLA and that is provided by the network slice in the specified location area includes: The network data analytics function network element determines the association relationship based on the application parameter and the network KPI. In this implementation, still another specific manner of how the network data analytics function network element determines the association relationship is provided.

In a possible implementation, the specified location area is an entire area in which the network slice provides a service or a partial location area in which the network slice provides a service. In this implementation, a specific manner of the specified location area is provided.

According to a second aspect, a communications apparatus is provided, including: an obtaining unit, configured to obtain an application information target value of a network slice in a specified location area, where the obtaining unit is further configured to obtain a network running information target value of the network slice in the specified location area based on an association relationship between application information and network running information and the application information target value, and the association relationship is used to describe an association relationship between application information and network running information when a communications service provided by the network slice in the specified location area meets a service level agreement SLA; and a sending unit, configured to send the network running information target value to an operation, administration, and maintenance server.

In a possible implementation, the application information target value includes an application parameter target value, and the network running information target value includes a network parameter target value; the application information target value includes an application parameter target value, and the network running information target value includes a network key performance indicator KPI target value; or the application information target value includes an application service volume target value, and the network running information target value includes a network KPI target value.

In a possible implementation, the communications apparatus further includes a receiving unit, configured to receive the application information target value from the operation, administration, and maintenance server or an application function network element.

In a possible implementation, the communications apparatus further includes a receiving unit; the receiving unit is configured to receive, from an application function network element, prediction information of a movement track of a terminal device and prediction information of an application parameter, where the prediction information of the application parameter is used to predict a mobility pattern and/or a communication pattern used by the terminal device; and the obtaining unit is configured to obtain the application information target value based on the prediction information of the movement track of the terminal device and the prediction information of the application parameter.

In a possible implementation, the communications apparatus further includes a determining unit, configured to determine the association relationship based on the application information and the network running information that correspond to the communications service that meets the SLA and that is provided by the network slice in the specified location area.

In a possible implementation, the communications apparatus further includes the receiving unit; the receiving unit is configured to receive application experience of the network slice in the specified location area from the application function network element; and the determining unit is configured to determine, based on the application experience, the communications service that meets the SLA.

In a possible implementation, the communications apparatus further includes the receiving unit; the receiving unit is configured to receive, from the application function network element, an application parameter that corresponds to the communications service that meets the SLA and that is provided by the network slice in the specified location area; the receiving unit is configured to receive, from a network function network element in the network slice, a network parameter that corresponds to the communications service that meets the SLA and that is provided by the network slice in the specified location area; and the determining unit is configured to determine the association relationship based on the application parameter and the network parameter.

In a possible implementation, the communications apparatus further includes the receiving unit; the receiving unit is configured to receive, from the application function network element, an application service volume of the communications service that meets the SLA and that is provided by the network slice in the specified location area; the receiving unit is configured to receive, from the operation, administration, and maintenance server, a network KPI of the communications service that meets the SLA and that is provided by the network slice in the specified location area; and the determining unit is configured to determine the association relationship based on the application service volume and the network KPI.

In a possible implementation, the communications apparatus further includes the receiving unit; the receiving unit is configured to receive, from the application function network element, an application parameter of the communications service that meets the SLA and that is provided by the network slice in the specified location area; the receiving unit is configured to receive, from the operation, administration, and maintenance server, a network KPI of the communications service that meets the SLA and that is provided by the network slice in the specified location area; and the determining unit is configured to determine the association relationship based on the application parameter and the network KPI.

In a possible implementation, the specified location area is an entire area in which the network slice provides a service or a partial location area in which the network slice provides a service.

According to a third aspect, an embodiment of this application provides a communications system, including the communications apparatus according to the second aspect.

According to a fourth aspect, an embodiment of this application provides a communications apparatus, including a processor and a memory. The memory is configured to store a program, and the processor invokes the program stored in the memory, to perform the communication method according to the first aspect and the possible implementations of the first aspect.

According to a fifth aspect, an embodiment of this application provides a storage medium. The storage medium stores a computer program. When the computer program is executed by a processor, the communication method according to the first aspect and the possible implementations of the first aspect is performed.

According to a sixth aspect, an embodiment of this application provides a computer program product. When the computer program product runs on a communications apparatus, the communications apparatus is enabled to perform the communication method according to the first aspect and the possible implementations of the first aspect.

According to a seventh aspect, an embodiment of this application provides a chip system, including a processor, configured to support a communications apparatus in performing the communication method according to the first aspect and the possible implementations of the first aspect.

For technical effects of the possible implementations of the second aspect to the seventh aspect, refer to the content described in the first aspect and the possible implementations of the first aspect.

BRIEF DESCRIPTION OF DRAWINGS

FIG. 4A-1 and FIG. 4A-2 is a schematic flowchart 6 of a communication method according to an embodiment of this application;

DESCRIPTION OF EMBODIMENTS

The embodiments of this application are described based on a 5G network scenario in a wireless communications network. It should be noted that, the solutions of the embodiments of this application may further be used in another wireless communications network, and a corresponding name may be replaced with a corresponding function name in the another wireless communications network.

Figure 1:
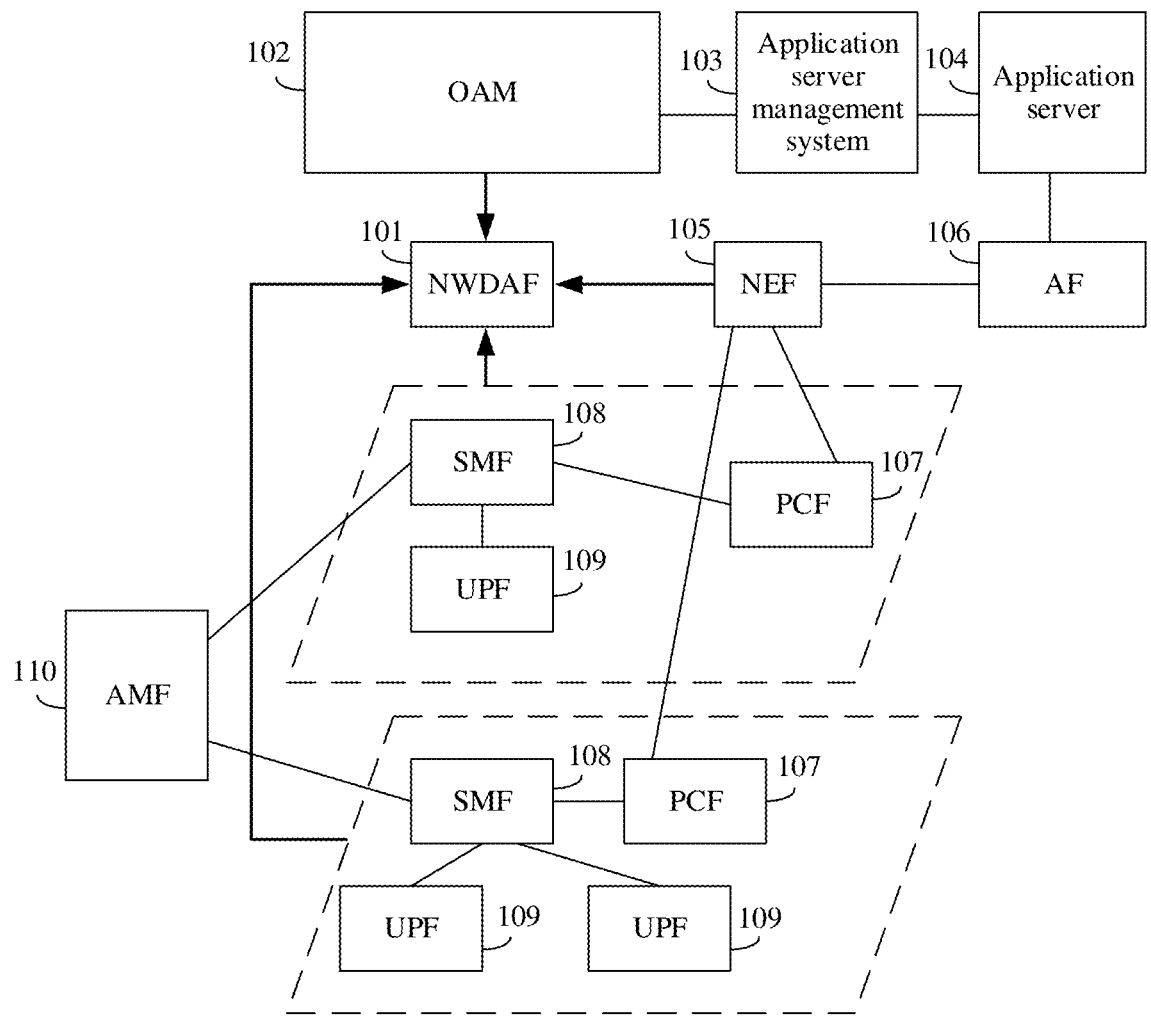
FIG. 1 is a schematic architectural diagram of a communications system according to an embodiment of this application.

FIG. 1 provides an architecture of a communications system. A communication method in this application may be applied to the architecture of the communications system. The architecture of the communications system includes: a network data analytics function (network data analytics function, NWDAF) network element 101, an operation, administration, and maintenance (OAM) server 102, an application server management system 103, an application server 104, a network exposure function (NEF) network element 105, an application function (AF) network element 106, a policy control function (PCF) network element 107, a session management function (SMF) network element 108, a user plane function (UPF) network element 109, and an access and mobility management function (AMF) network element 110.

The NWDAF network element 101 is a network data analytics function network element that is in a 5G network and that is defined in 3GPP SA2. The NWDAF network element 101 may collect data from each NF network element (for example, the PCF network element 107, the SMF network element 108, or the UPF network element 109), the AMF network element, the AF network element (through the NEF network element), and the OAM server 102, and perform analysis and prediction.

The OAM server 102 may enable an operator management network element to perform fault management, configuration management, performance management, network functions virtualization management, and the like on a telecommunications network.

The application server management system 103 may be used by an industry or a third party that provides an application service to manage an application server, monitor application service quality, and change and optimize the application service.

The application server 104 may provide various application services, such as a video on demand service and an internet of vehicles service, for a terminal device by using a communications network of an operator.

The NEF network element 105 may expose some functions of a network to an application service in a controlled manner, or may enable a network element in a network to obtain, from an application service, data and control provided by an application.

The AF network element 106 may provide service control and service data of various application services for a control plane network element in a communications network of an operator, or obtain data information and control information of a network from a control plane network element in a communications network.

The PCF network element 107 may enable an operator to provide a control policy for mobility and access management and session management of a terminal device.

The SMF network element 108 may be responsible for session management in a mobile network, for example, session establishment, session modification, and session release. A specific function is, for example, allocating an internet protocol (IP) address to a terminal device, or selecting a UPF network element that provides a packet forwarding function.

The UPF network element 109 may be responsible for processing a user packet, for example, forwarding the user packet and charging for the user packet.

The AMF network element 110 may be responsible for mobility management in a mobile network, for example, location update, network registration, and handover of a terminal device.

The foregoing network elements may be collectively referred to as network devices. The following uses a network device as an example to describe a structure of the network device. The network elements are not limited to having units or components shown in the following figure in the embodiments of this application, and may have more or fewer units or components.

Figure 2:
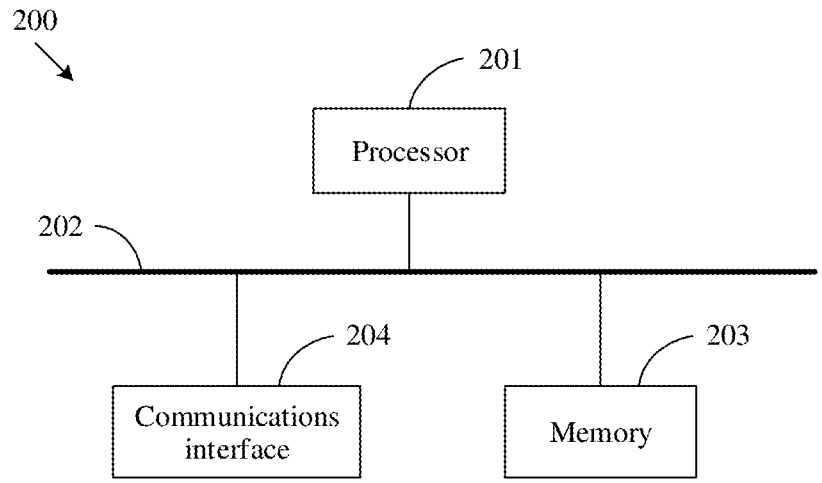
FIG. 2 is a schematic structural diagram 1 of a communications apparatus according to an embodiment of this application.

As shown in FIG. 2, an embodiment of this application provides a schematic structural diagram of a communications apparatus 200. The communications apparatus 200 may include at least one processor 201, a communications line 202, and a memory 203.

The memory 203 is configured to store a computer-executable instruction (which may be referred to as application program code) for executing the solutions of this application, and the processor 201 controls the execution.

The processor 201 is configured to execute the computer-executable instruction stored in the memory 203, to implement steps or actions of each network element or device in the following embodiments of this application.

The processor 201 may be a general-purpose central processing unit (CPU), a microprocessor, an application-specific integrated circuit (ASIC), or one or more integrated circuits configured to control program execution of the solution in this application.

The communications line 202 is configured to transmit information between the processor 201 and the memory 203.

Optionally, the communications apparatus 200 further includes at least one communications interface 204, configured to communicate with another device or a communications network.

The communications interface may be the Ethernet, a radio access network (radio access network, RAN), a wireless local area network (wireless local area networks, WLAN), or the like.

For example, the communications interface 204 may communicate with the another device or the communications network by using a wired or wireless communications technology. Specifically, the communications interface may be an apparatus, for example, a transceiver. This is not limited.

The communications line 202 is further configured to transmit information between the at least one communications interface 204, the processor 201, and the memory 203.

The memory 203 may be a read-only memory (ROM) or another type of static storage device that can store static information and an instruction, or random access memory (RAM) or another type of dynamic storage device that can store information and an instruction, or may be an electrically erasable programmable read-only memory (EE- PROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 203 is not limited thereto.

The memory 203 may exist independently, and is connected to the processor through the communications line 202.

Alternatively, the memory 203 may be integrated with the processor 201.

Table 1 and Table 2 describe service features and performance requirements of some typical application services. An operator and a tenant may further sign a service level agreement (SLA) of a network slice based on Table 1 and Table 2. In a running phase of the network slice, the operator needs to ensure that a communications service provided by the network slice can meet the signed SLA.

TABLE 1

Service features and performance requirements for high data rate and high traffic density scenarios

| Scenario | Experienced data rate (DL) | Experienced data rate (UL) | Area traffic capacity (DL) | Area traffic capacity (UL) | Overall user density | Activity factor | UE speed | Coverage |
|---|---|---|---|---|---|---|---|---|
| Urban macro | 50 Mbit/s | 25 Mbit/s | 100 Gbit/s/km$^2$ | 50 Gbit/s/km$^2$ | 10000/km$^2$ | 20% | Pedestrians and users in vehicles (up to 120 km/h) | Full network (note 1) |
| Rural macro | 50 Mbit/s | 25 Mbit/s | 1 Gbit/s/km$^2$ (note 4) | 500 Mbit/s/km$^2$ (note 4) | 100/km$^2$ | 20% | Pedestrians and users in vehicles (up to 120 km/h) | Full network (note 1) |
| Indoor hotspot | 1 Gbit/s | 500 Mbit/s | 15 Tbit/s/km$^2$ | 2 Tbit/s/km$^2$ | 250000/km$^2$ | note 2 | Pedestrians | Office or confined area (note 3) |
| Broadband access in a crowd | 25 Mbit/s | 50 Mbit/s | [3, 75] Tbit/s/km$^2$ | [7, 5] Tbit/s/km$^2$ | [500000]/km$^2$ | 30% | Pedestrians | Confined area |
| Dense urban | 300 Mbit/s | 50 Mbit/s | 750 Gbit/s/km$^2$ (note 4) | 125 Gbit/s/km$^2$ (note 4) | 25000/km$^2$ | 10% | Pedestrians and users in vehicles (up to 120 km/h) | Downtown |
| Broadcast-like services | Maximum 200 Mbit/s (per TV channel) | N/A or modest (e.g. 500 kbit/s per user) | N/A | N/A | TV channels of [20 Mbit/s] on one carrier | N/A | Stationary users, pedestrians and users in vehicles (up to 500 km/h) | Full network |
| High-speed train | 50 Mbit/s | 25 Mbit/s | 15 Gbit/s/train | 7.5 Gbit/s/train | 1000/train | 30% | Users in trains (up to 500 km/h) | Along railways |
| High-speed vehicle | 50 Mbit/s | 25 Mbit/s | [100] Gbit/s/km$^2$ | [50] Gbit/s/km$^2$ | 4000/km$^2$ | 50% | Users in vehicles (up to 250 km/h) | Along roads |
| Airplanes connectivity | 15 Mbit/s | 7.5 Mbit/s | 1.2 Gbit/s/plane | 600 Mbit/s/plane | 400/plane | 20% | Users in airplanes (up to 1000 km/h) | (note 1) |

Note 1:
For users in vehicles, the terminal device can be connected to the network directly, or via an on-board moving base station.
Note 2:
A certain traffic mix is assumed; and only some users use services that require the highest data rates.
Note 3:
For interactive audio and video services, for example, virtual meetings, the required two-way end-to-end (end to end, E2E) latency (UL and DL) is 2 to 4 ms while the corresponding experienced data rate needs to be up to 8K 3D video [300 Mbit/s] in uplink and downlink.
Note 4:
These values are derived based on overall user density.

TABLE 2

Service features and performance requirements for low latency and high reliability scenario

| Scenario | End-to-end latency | Jitter | Survival time | Communications service availability (note 4) | Reliability (note 4) | User experienced data rate | Packet payload Packet size (note 5) | Communication traffic density (note 6) | Connection density (note 7) | Service area dimension (note 8) |
|---|---|---|---|---|---|---|---|---|---|---|
| Discrete automatic motion control (note 1) | 1 ms | 1 μs | 0 ms | 99.9999% | 99.9999% | 1 Mbit/s to 10 Mbit/s | Small | 1 Tbps/km$^2$ | 100000/km$^2$ | 100 × 100 × 30 m |
| Discrete automation | 10 ms | 100 μs | 0 ms | 99.99% | 99.99% | 10 Mbit/s | Small to big | 1 Tbit/s/km$^2$ | 100000/km$^2$ | 1000 × 1000 × 30 m |

TABLE 2-continued

Service features and performance requirements for low latency and high reliability scenario

| Scenario | End-to-end latency | Jitter | Survival time | Communications service availability (note 4) | Reliability (note 4) | User experienced data rate | Packet payload Packet size (note 5) | Communication traffic density (note 6) | Connection density (note 7) | Service area dimension (note 8) |
|---|---|---|---|---|---|---|---|---|---|---|
| Process automation-remote control | 50 ms | 20 ms | 100 ms | 99.9999% | 99.9999% | 1 Mbit/s to 100 Mbit/s | Small to big | 100 Gbit/s/km² | 1000/km² | 300 × 300 × 50 m |
| Process automation-monitoring | 50 ms | 20 ms | 100 ms | 99.9% | 99.9% | 1 Mbit/s | Small | 10 Gbit/s/km² | 10000/km² | 300 × 300 × 50 |
| Energy distribution-medium voltage | 25 ms | 25 ms | 25 ms | 99.9% | 99.9% | 10 Mbit/s | Small to big | 10 Gbit/s/km² | 1000/km² | 100 km along a power line |
| Energy distribution-high voltage (Note 2) | 5 ms | 1 ms | 10 ms | 99.9999% | 99.9999% | 10 Mbit/s | Small | 100 Gbit/s/km² | 1000/km² (note 9) | 200 km along a power line |
| Intelligent transport systems-infrastructure backhaul | 10 ms | 20 ms | 100 ms | 99.9999% | 99.9999% | 10 Mbit/s | Small to big | 10 Gbit/s/km² | 1000/km² | 2 km along a road |
| Tactility and interaction (note 1) | 0.5 ms | To be determined | To be determined | [99.999%] | [99.999%] | [Low] | [Small] | [Low] | [Low] | To be determined |
| Remote control | [5 ms] | To be determined | To be determined | [99.999%] | [99.999%] | [From low to 10 Mbit/s] | [Small to big] | [Low] | [Low] | To be determined |

Note 1:
A traffic priority and a hosted service that are close to an ultimate user may help achieve a lowest latency value.
Note 2:
Currently, a wired communications line is used for implementation.
Note 4:
The communications service availability is related to a service interface, and the reliability is related to a given node. The reliability should be equal to or higher than the communications service availability.
Note 5:
Small: payload typically ≤256 bytes
Note 6:
Based on the assumption that all connected applications within the service volume require the user experienced data rate.
Note 7:
Under the assumption of 100% 5G penetration.
Note 8:
Estimates of maximum dimensions; the last figure is the vertical dimension.
Note 9:
In a densely populated urban area A MANO network element allocates a virtual resource to a network slice, and deploys a VNF network element on the virtual resource. The MANO network element includes a network functions virtualization orchestrator (NFVO), a virtualized network function manager (VNFM), and a virtualized infrastructure manager (VIM). Both the NFVO and the VNFM can drive the VIM to automatically scale out/in the virtual resource of the VNF network element. The VNFM monitors VNF network element performance indicators, such as CPU utilization, memory utilization, and storage utilization. If the performance indicators each exceed an overload threshold, scaling-out is triggered. If the performance indicators each are lower than a resource recycling threshold, scaling-in is triggered. The NFVO may change allocation of the virtual resource based on a network service (NS) modification request sent by an NSSMF. The NFVO and the VNFM may further monitor a key performance indicator (KPI) of an NF network element and a key performance indicator of a network according to a configured rule, for example, perform scaling-out/scaling-in based on a throughput value of an interface.

An NFV scaling-out/scaling-in mechanism lags behind a service change. In a process of monitoring a KPI change to completing resource adjustment, service experience and an SLA cannot be ensured. Therefore, the resource adjustment cannot be performed in advance based on a change of an application service to ensure the application experience and the SLA. In addition, due to mobility of the terminal device, a service change at a specific location is usually more severe than an average change of an entire slice, and a network function at the specific location is prone to overload. Therefore, prediction needs to be performed in advance and then the resource adjustment is performed. However, this requirement cannot be met in the prior art.

The following describes terms used in the embodiments of this application.

An NF network element includes but is not limited to an AMF network element, an SMF network element, a UPF network element, and the like.

A specified time period may be a specified range from a start time to an end time, a time period from a current time to a previous time, or a specified time point.

A specified location area may be an entire area in which a network slice provides a service or a partial location area in which a network slice provides a service, for example, a cell, a tracking area, an AMF region, an SMF service area a UPF service area, or the foregoing corresponding geographical area.

Application information includes at least one of an application parameter and an application service volume.

The application parameter is used to determine a mobility pattern and/or a communication pattern used by a terminal device of a user when the user uses an application service. The mobility pattern is a feature represented by historical statistics of a mobility behavior of a terminal device, and may be determined by an AMF network element or an NWDAF network element based on a parameter of the feature of the mobility behavior of the terminal device in the application parameter. The parameter of the feature of the mobility behavior of the terminal device in the application parameter may include a static time, a motion time, a static duration length, a motion duration length, a moving speed, or the like of the terminal device. For example, the terminal device moves once between 8:00 and 9:00 every day, and an average moving distance is 500 meters. The communication pattern is a feature represented by historical statistics of a communication behavior of the terminal device, and may be determined by an AF network element or the NWDAF network element based on a parameter of the feature of the communication behavior of the terminal device in the application parameter. The parameter of the feature of the communication behavior of the terminal device in the application parameter may include a time at which an application layer initiates communication and ends the communication, a communication duration length, communication silence duratio, average communication traffic, burst communication traffic, a communication packet length, a quantity of communication times per unit time, or the like. For example, the terminal device initiates an application communication connection every 30 seconds on average, and sends and receives 30 packets on average. An average data packet length is 200 bytes.

It should be noted that the application service may be one or more application services supported by the network slice. This is not limited.

The application service volume may be used to describe a quantity of connections or data traffic of an application layer service between a terminal device and an application server, or a quantity of communication connections or data traffic of an application layer service between terminal devices. For example, maximum data traffic of an application service is 10 Gbit/s, and a maximum quantity of application layer service connections simultaneously existing between the terminal devices is 100 000.

An application information target value includes at least one of an application parameter target value and an application service volume target value.

The application parameter target value is a target value of a mobility pattern of a terminal device and/or a target value of a communication pattern of a terminal device that need/ needs to be supported by a network slice. For example, it is expected that a maximum moving speed that is of moving the terminal device and that is supported by the network slice is 150 km/h, a maximum burst communication traffic that is supported by the network slice is 300 Mbit/s, and a maximum length of an application data packet to be transmitted by the network slice is 25 kByte.

The application service volume target value refers to a performance requirement of an application service that needs to be supported by a network slice. The performance requirement may include a requirement for a quantity of communication connections or a requirement for data traffic of an application layer service that is of the network slice and that is between a terminal device and an application server, a requirement for a quantity of communication connections or a requirement for data traffic of an application layer service between terminal devices, or the like.

Application experience is used to describe a degree to which a network slice meets a supported application service requirement, for example, a customer experience index (CEI) of an application service, a mean opinion score (MOS) of an audio and video application, and quality of experience (QoE) of a customer. For details, refer to Table 4.

Network running information includes at least one of a network parameter and a network KPI.

The network parameter is a running status parameter of an NF network element in a network slice, for example, a cache function status and a session continuity mode. It should be noted that a value of the network parameter may be affected by changing a configuration of the NF network element. The network KPI is a key performance statistics result of a network slice and/or a network function network element in a network slice that is collected by an operation, administration, and maintenance server. The network KPI may specifically be an overall end-to-end network KPI of the network slice, or may be a network KPI of the NF network element in the network slice, refer to Table 5, for example, an uplink throughput of a network slice instance, a maximum quantity of PDU sessions of an SMF network element, or the like.

A network running information target value includes at least one of a network parameter target value and a network KPI target value.

The network parameter target value refers to a preset value of a network parameter recommended by a network data analytics function. For example, it is recommended that a caching function status parameter be set to ON and that a session continuity mode parameter be set to Mode 2. The network KPI target value is a network KPI of a network slice recommended by a network data analytics function, and may also be referred to as an expected value of a network KPI of an NF network element in the network slice. For example, a maximum quantity of PDU sessions of an SMF network element is 100 000 and a maximum value of an uplink throughput of a network slice instance is 500 Mbit/s.

An SLA refers to a type of a communications service provided by a network slice agreed upon between an operator and a tenant of the operator in a form of a contract and a service feature and a performance requirement of an application service supported by each communications service, to ensure availability and application experience of the application service. For example, the SLA stipulates that the operator provides, by using the network slice, communications services, such as transmitting application data, reporting a location of the terminal device, and paging the terminal device to an industry user. The application data transmission requires that a latency be less than 20 ms, a maximum traffic bandwidth be greater than or equal to 100 Mbit/s, and a packet loss rate be less than or equal to 1%.

Prediction information of a movement track of a terminal device is used to predict the movement track of the terminal device, for example, a driving route planned by an in-vehicle navigation service.

Prediction information of an application parameter is used to predict a mobility pattern and/or a communication pattern used by a terminal device.

An association relationship between application information and network running information is used to describe an association relationship between application information and network running information when a communications service provided by a network slice in a specified location area meets an SLA. For example, in an entire area in which an entire network slice provides a service or in a partial area in which a network slice provides a service, when a communications service provided by the network slice meets an SLA signed between a tenant and an operator (that is, expected application service availability and an expected application experience can be ensured), the association relationship may be the association relationship between the application information and the network running information.

Figure 3A:
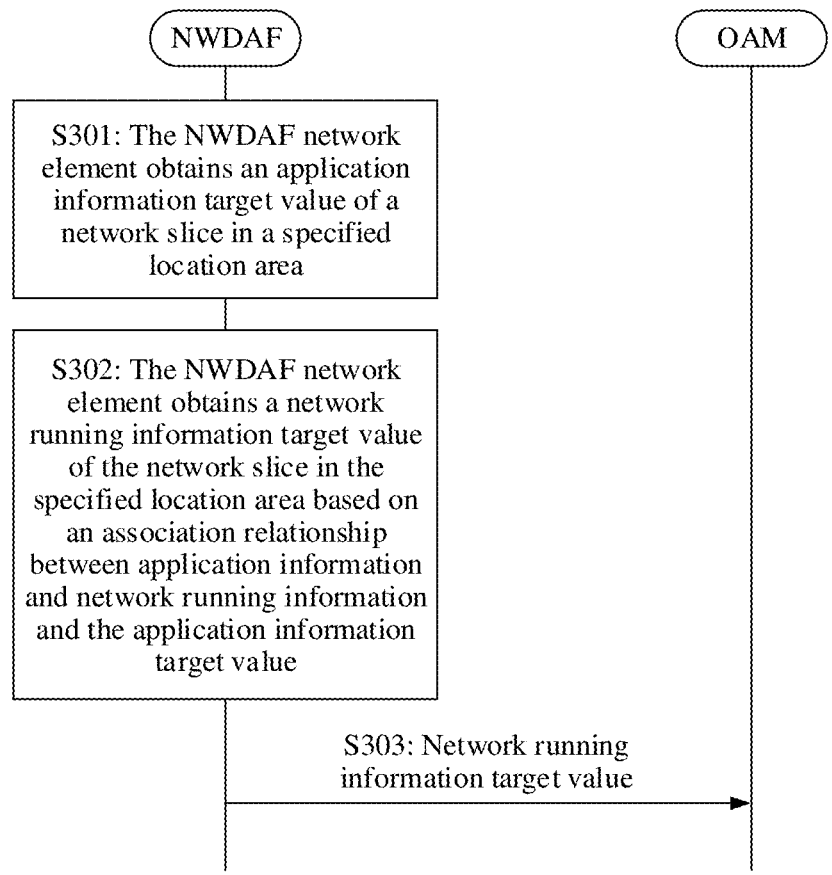
FIG. 3A is a schematic flowchart 1 of a communication method according to an embodiment of this application.

Referring to FIG. 3A, an embodiment of this application provides a communication method. The following describes the communication method.

S301: An NWDAF network element obtains an application information target value of a network slice in a specified location area.

In a possible implementation, the NWDAF network element may receive the application information target value from an OAM server or an AF network element. For details, refer to the descriptions in step S407 or S507.

In another possible implementation, the NWDAF network element may receive, from an AF network element, prediction information of a movement track of a terminal device and prediction information of an application parameter, where the prediction information of the application parameter is used to predict a mobility pattern and/or a communication pattern used by the terminal device. The NWDAF network element obtains the application information target value based on the prediction information of the movement track of the terminal device and the prediction information of the application parameter. For details, refer to descriptions in step S610.

S302: The NWDAF network element obtains a network running information target value of the network slice in the specified location area based on an association relationship between application information and network running information and the application information target value.

In a possible implementation, the application information target value includes an application parameter target value, and the network running information target value includes a network parameter target value; the application information target value includes an application parameter target value, and the network running information target value includes a network KPI target value; or the application information target value includes an application service volume target value, and the network running information target value includes a network KPI target value.

The association relationship between the application information and the network running information may be determined by the NWDAF network element. Refer to steps S304 to S312. Alternatively, the association relationship may be obtained from another network element. For example, the AF network element may determine the association relationship between the application information and the network running information by using a method provided in steps S304 to S312, and send the association relationship to the NWDAF network element. This is not limited.

Specifically, for S302, refer to related descriptions in step S408.

S303: The NWDAF network element sends the network running information target value to the OAM server.

Specifically, for S303, refer to related descriptions in step S408 or S611.

In the communication method in this embodiment of this application, the NWDAF network element obtains the application information target value of the network slice in the specified location area. The NWDAF network element obtains the network running information target value of the network slice in the specified location area based on the association relationship between the application information and the network running information and the application information target value, and sends the network running information target value to the OAM server. According to this method, the network running information target value is dynamically adjusted, and a dynamic change of a service feature or a performance requirement of an application service is responded to in a timely manner.

Figure 3B:
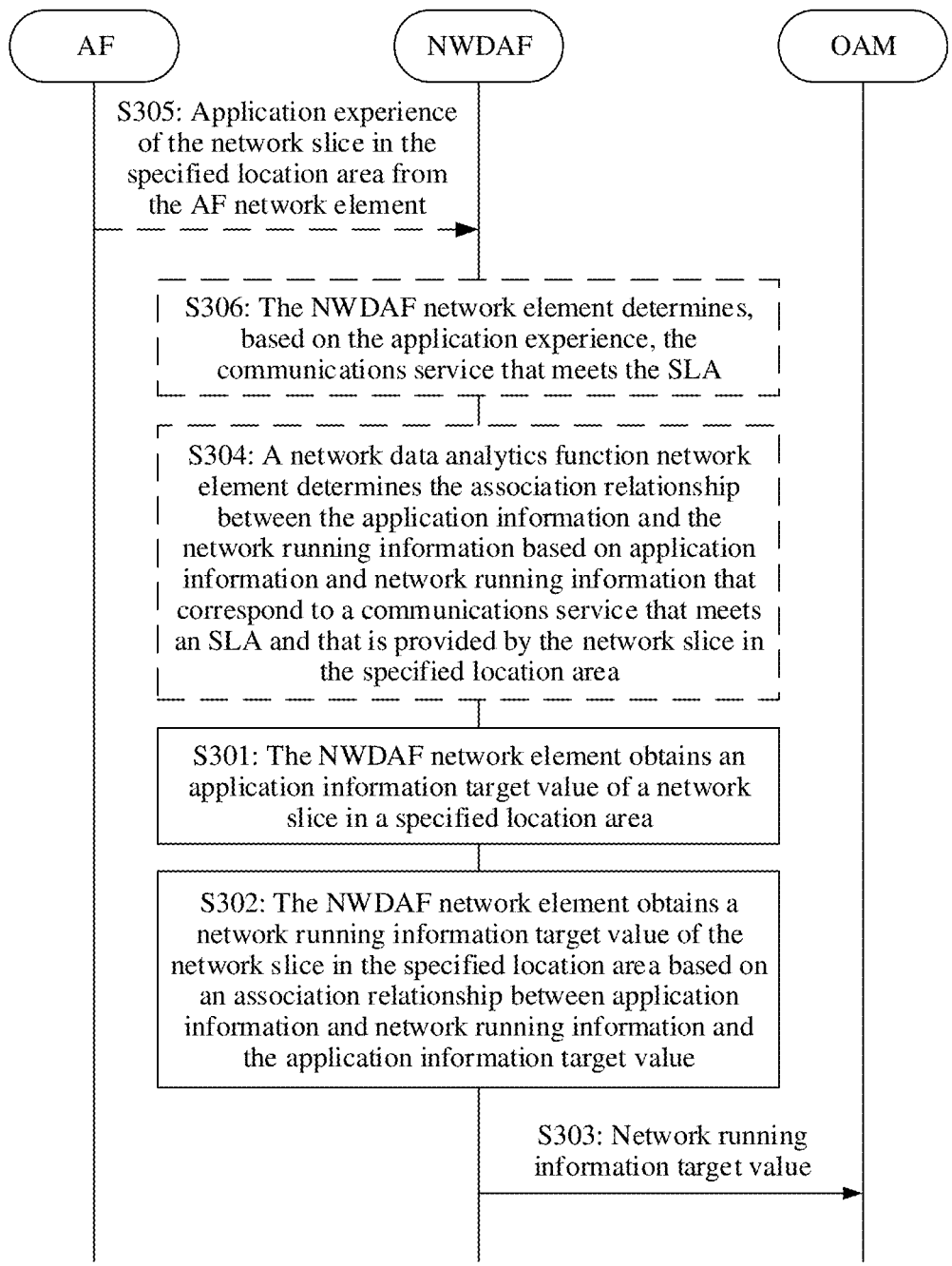
FIG. 3B is a schematic flowchart 2 of a communication method according to an embodiment of this application.

Optionally, as shown in FIG. 3B, in an implementation scenario of the foregoing embodiment, the communication method further includes step S304.

S304: A network data analytics function network element determines the association relationship between the application information and the network running information based on application information and network running information that correspond to a communications service that meets an SLA and that is provided by the network slice in the specified location area.

In a possible implementation, the NWDAF network element determines the association relationship between the application information and the network running information based on the application information and the network running information that correspond to the communications service that meets the SLA and that is provided by the network slice in the specified location area. The communications service that meets the SLA may be a communications service that meets the SLA within a preset time period (for example, from 02:00 to 03:00), or may be a communications service that meets the SLA at a preset time point (for example, five minutes before).

Specifically, for step S304, refer to related descriptions in steps S405 and S406. Details are not described.

In addition, the communications service that meets the SLA and that is provided by the network slice in the specified location area may be provided by the AF network element, or may be provided by using the method shown in FIG. 3B. Details are as follows.

S305: The NWDAF network element receives application experience of the network slice in the specified location area from the AF network element.

In a possible implementation, the NWDAF network element receives the application experience of the network slice in the specified location area from the AF network element.

Specifically, for S305, refer to related descriptions in step S402.

S306: The NWDAF network element determines, based on the application experience, the communications service that meets the SLA.

Specifically, for S306, refer to related descriptions in step S404.

It should be noted that steps S305 and S306 may alternatively be performed by the AF network element. In this case, the communications service that meets the SLA and that is provided by the network slice in the specified location area may be sent by the AF network element to the NWDAF network element.

Figure 3C:
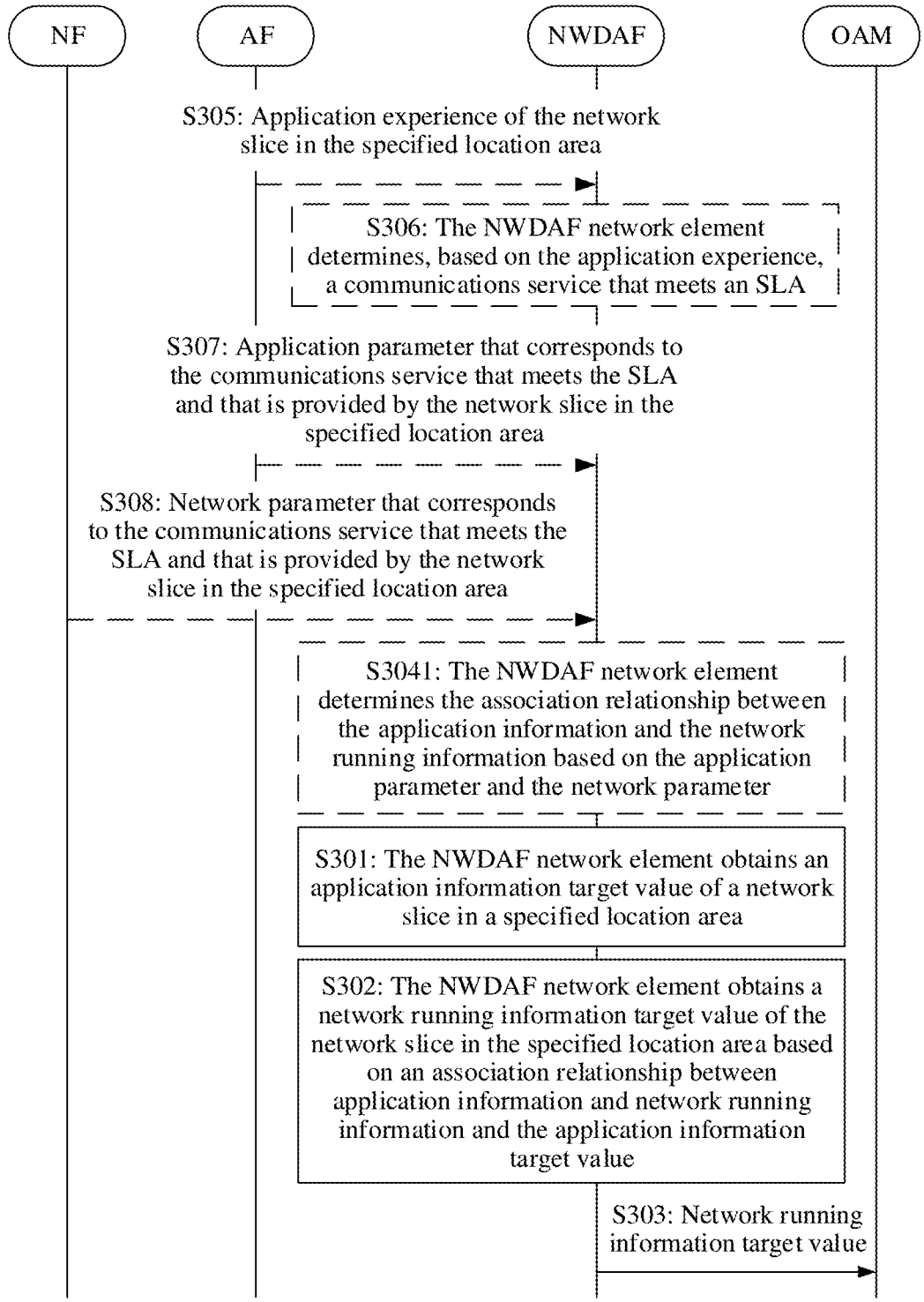
FIG. 3C is a schematic flowchart 3 of a communication method according to an embodiment of this application.

Further, optionally, as shown in FIG. 3C, in an implementation based on the foregoing implementation scenario, the communication method may further include the following steps.

S307: The NWDAF network element receives, from the AF network element, an application parameter that corresponds to the communications service that meets the SLA and that is provided by the network slice in the specified location area.

S308: The NWDAF network element receives, from an NF network element in the network slice, a network parameter that corresponds to the communications service that meets the SLA and that is provided by the network slice in the specified location area.

Correspondingly, step S304 may include:

S3041: The NWDAF network element determines the association relationship between the application information and the network running information based on the application parameter and the network parameter.

Specifically, for S3041, refer to related descriptions of Manner 1 in step S4051. Details are not described.

Figure 3D:
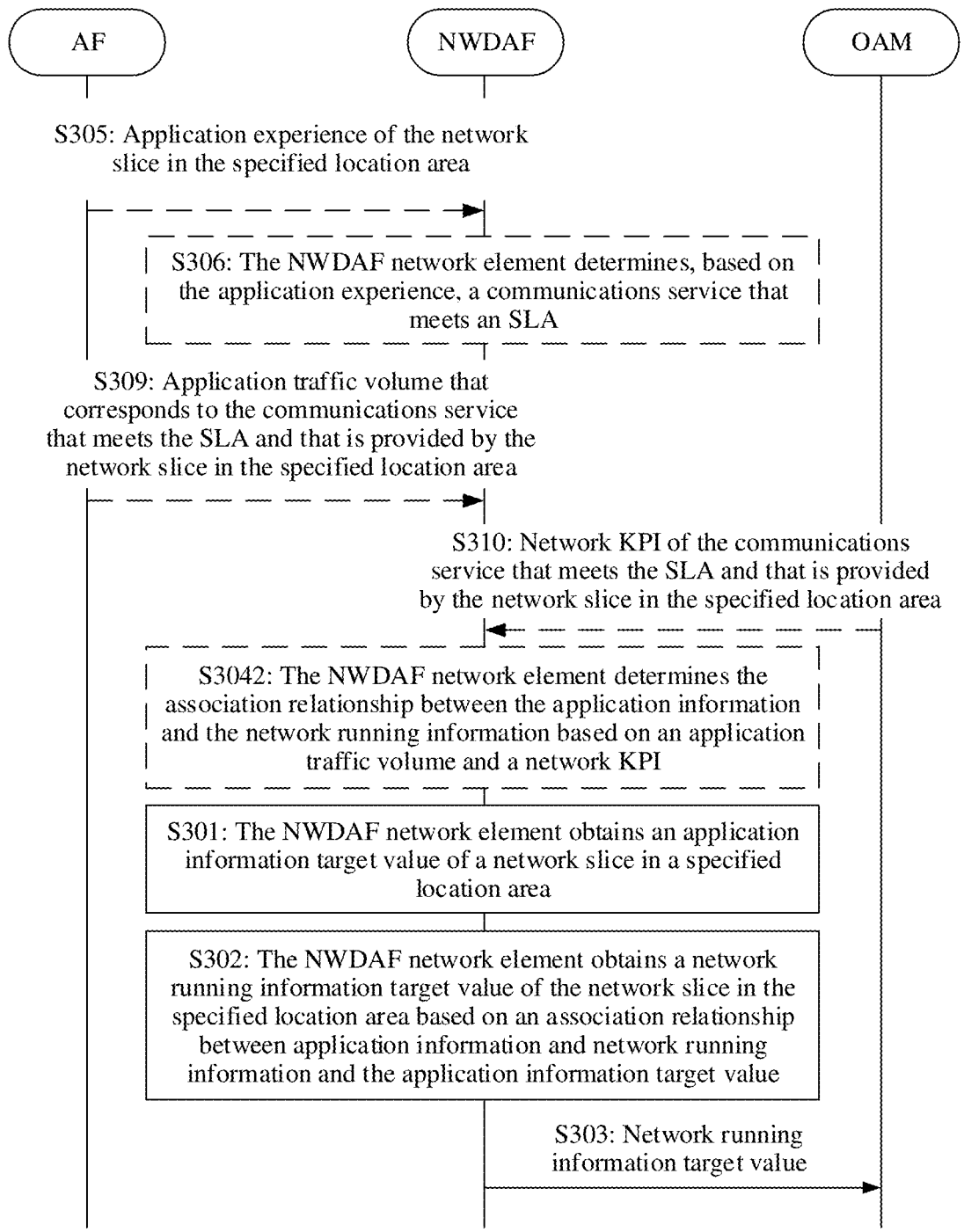
FIG. 3D is a schematic flowchart 4 of a communication method according to an embodiment of this application.

Further, optionally, as shown in FIG. 3D, in another implementation based on the foregoing implementation scenario, the communication method may further include:

S309: The NWDAF network element receives, from the AF network element, an application service volume of the communications service that meets the SLA and that is provided by the network slice in the specified location area.

S310: The NWDAF network element receives, from the OAM server, a network KPI of the communications service that meets the SLA and that is provided by the network slice in the specified location area.

Correspondingly, step S304 may include:

S3042: The NWDAF network element determines the association relationship between the application information and the network running information based on the application service volume and the network KPI.

Specifically, for S3042, refer to related descriptions of Manner 3 in step S4051.

Figure 3E:
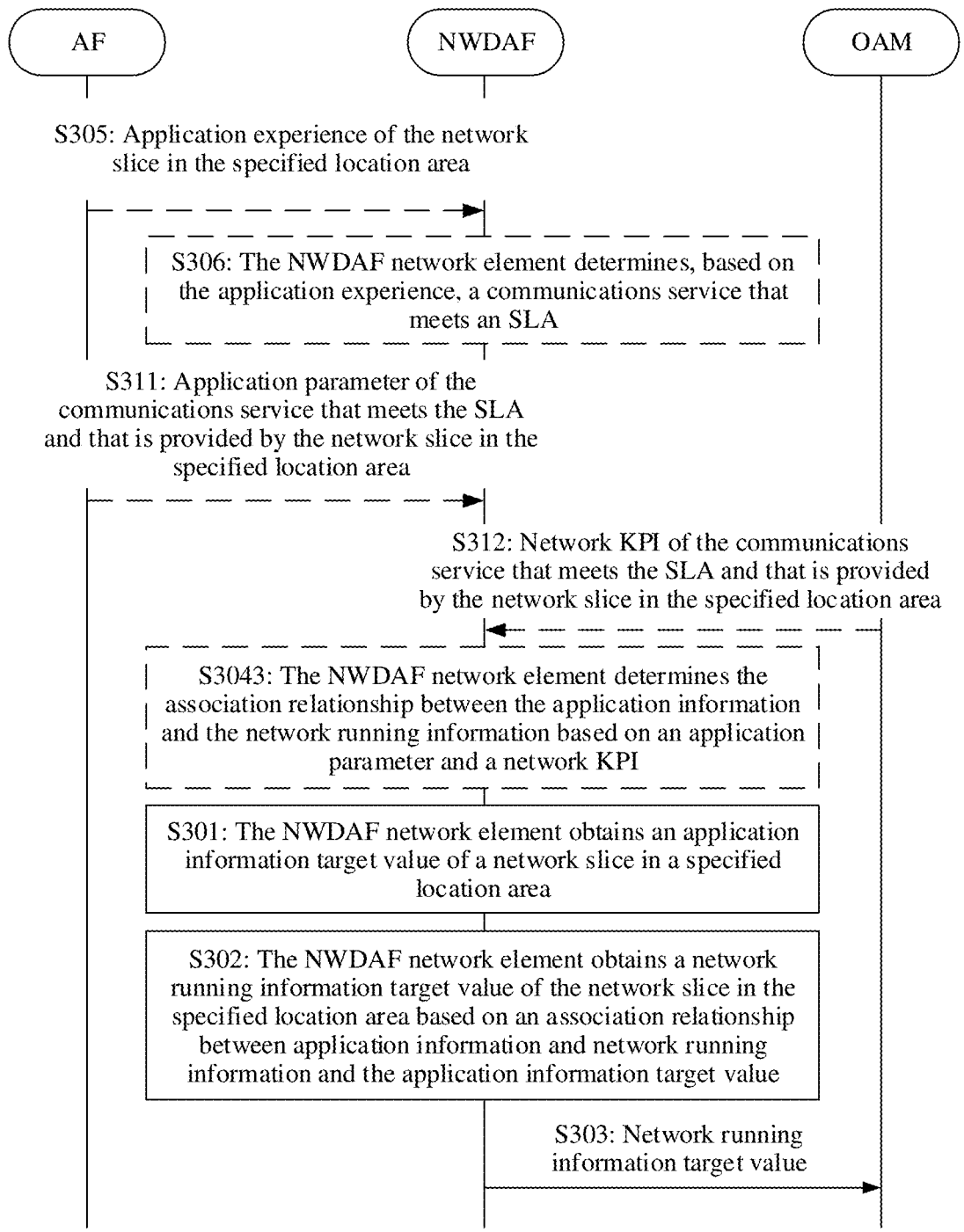
FIG. 3E is a schematic flowchart 5 of a communication method according to an embodiment of this application.

Optionally, as shown in FIG. 3E, in still another implementation based on the foregoing implementation scenario, the communication method may further include:

S311: The NWDAF network element receives, from the AF network element, an application parameter of the communications service that meets the SLA and that is provided by the network slice in the specified location area.

S312: The NWDAF network element receives, from the OAM server, a network KPI of the communications service that meets the SLA and that is provided by the network slice in the specified location area.

Correspondingly, step S304 may include:

S3043: The NWDAF network element determines the association relationship between the application information and the network running information based on the application parameter and the network KPI.

Specifically, for S3043, refer to related descriptions of Manner 2 in step S4051.

Figures 1, 4A:
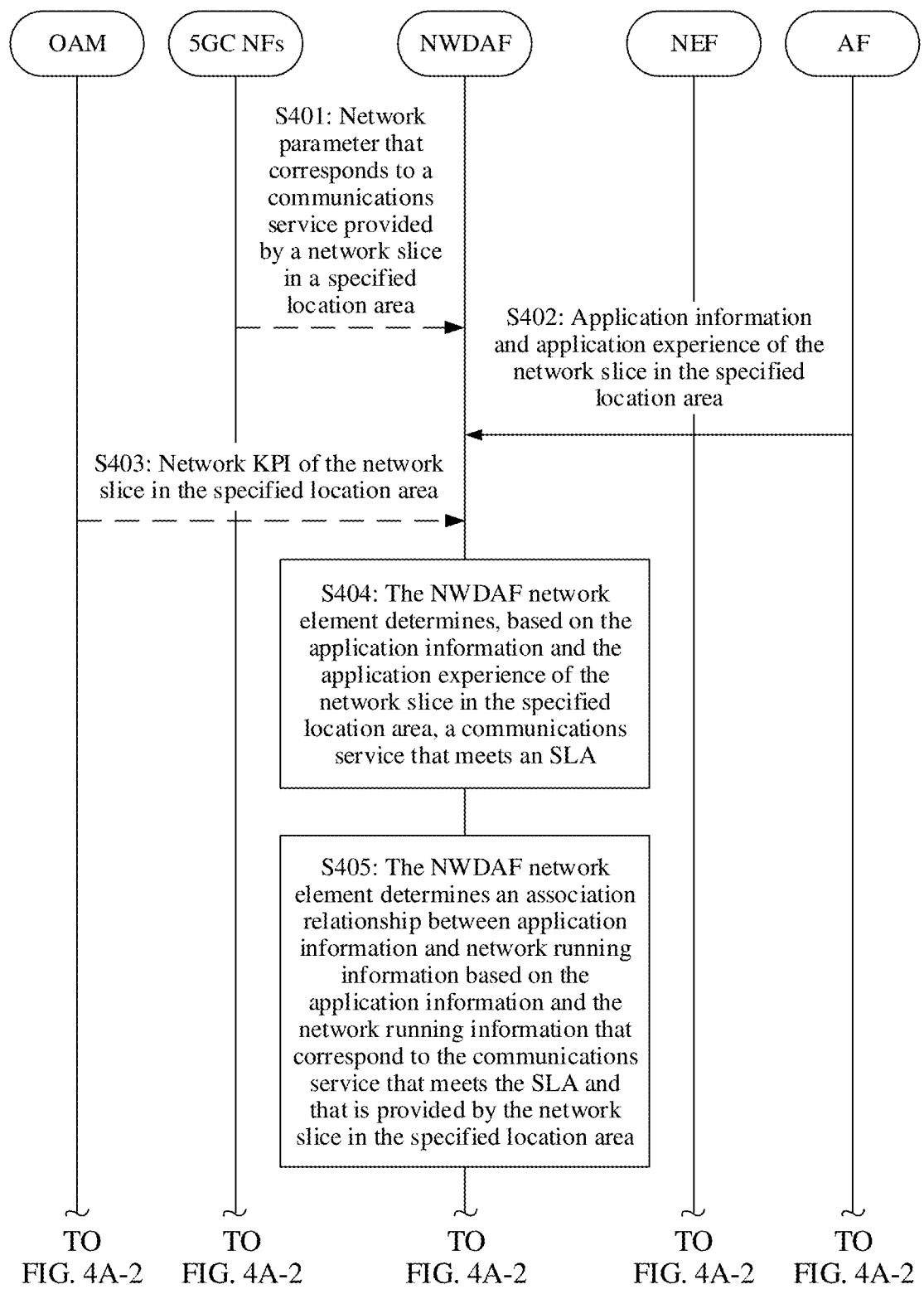
Figures 2, 4A:
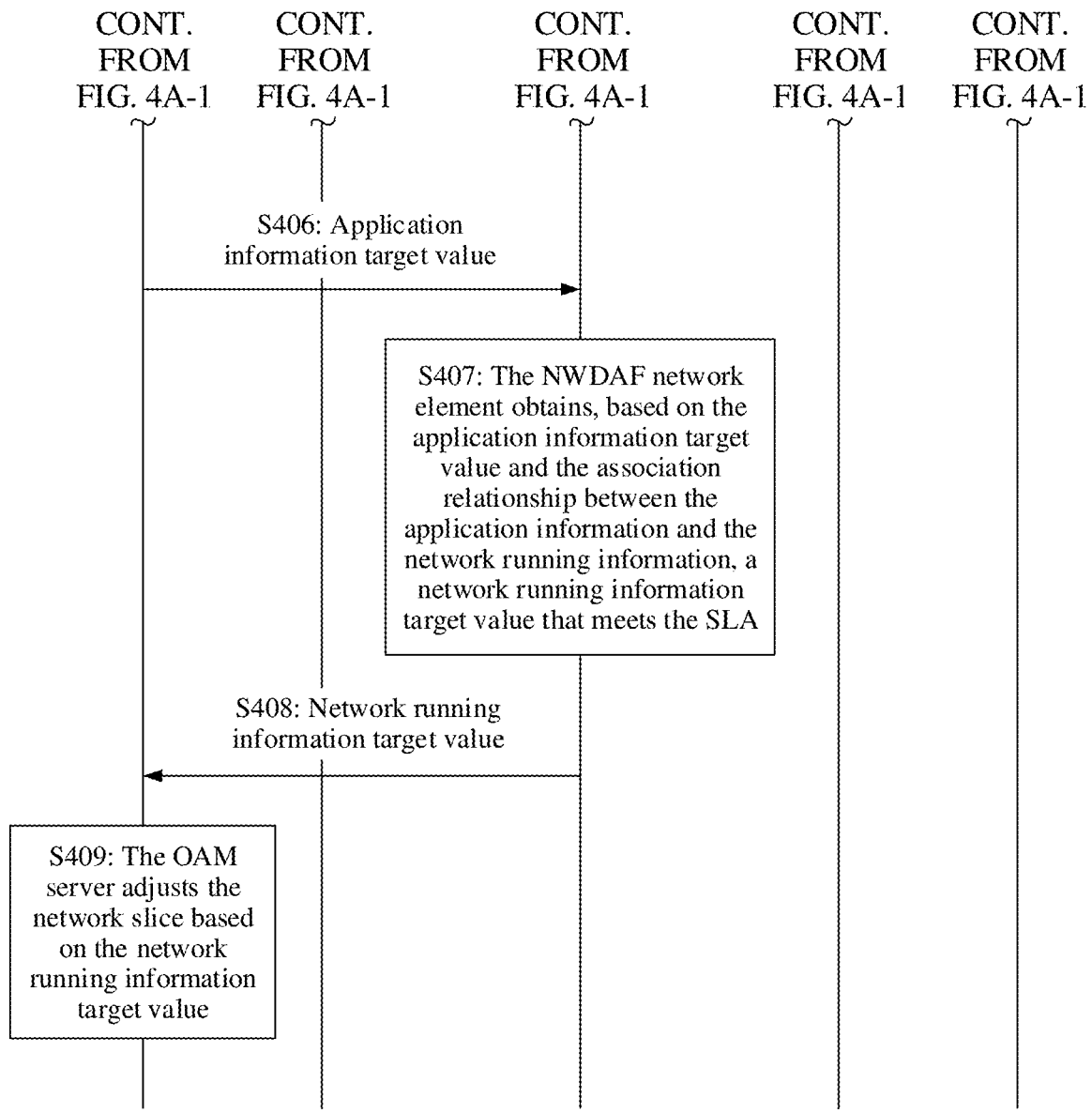

As shown in FIG. 4A-1 and FIG. 4A-2, an embodiment of this application provides another communication method. The method may be applied to a scenario: After a requirement of an application service is adjusted, an OAM server requests a recommended network running information target value from an NWDAF network element, and the OAM server performs resource adjustment or configuration adjustment on a network slice based on the network running information target value. The communication method is described as follows.

S401: The NWDAF network element receives a network parameter that corresponds to a communications service provided by a network slice in a specified location area.

Specifically, the NWDAF network element may receive, from various NF network elements in a 5G core network (5GC), for example, an AMF network element, an SMF network element, and a UPF network element, the network parameter that corresponds to the communications service provided by the network slice in the specified location area. For example, the NWDAF network element may request, from the NF network element, the network parameter that corresponds to the communications service provided by the network slice in the specified location area within a specified time period, and receive the network parameter that corresponds to the communications service provided by the network slice in the specified location area within the specified time period and that is sent by the NF network element. For another example, the NF network element may send, to the NWDAF network element in real time or periodically, the network parameter that corresponds to the communications service provided by the NF network element in the specified location area. This is not limited.

The network parameter may include but is not limited to categories and examples shown in Table 3.

TABLE 3

| Category | Example |
| --- | --- |
| Slice parameter | Single network slice selection assistance information (S-NSSAI) |
| Location parameter | Geographical area or tracking area identity (TAI) |
| Access parameter | Access type or cell identifier (cell ID) |
| Application parameter | Data network name (DNN) or application function identification (AFid) |
| User identifier (user ID) | Subscription permanent identifier (SUPI), permanent equipment identifier (PEI), global personal security identifier (GPSI), or user group identifier (group ID) |
| Terminal identifier (terminal ID) | Permanent equipment identifier (PEI), terminal equipment identifier (TEI), or terminal type |
| Communication behavior identifier (activity ID | Registration, mobility, sessions, or service flows |
| Function or feature option parameter | Cache function on/off status or service continuity mode |

S402: The NWDAF network element receives application information and application experience of the network slice in the specified location area from the AF network element.

Specifically, in S402, the NWDAF network element may request, from the AF network element, the application information and the application experience of the network slice in the specified location area within the specified time period, and receive the application information and application experience of the network slice in the specified location area. For example, in S402, the NWDAF network element may request, from the AF network element, the application information and the application experience of the network slice in the specified location area within the specified time period, and receive the application information and the application experience of the network slice in the specified location area within the specified time period. For another example, the NF network element may send the application information and the application experience of the NF network element in the specified location area to the NWDAF network element in real time or periodically. This is not limited.

The application information may include at least one of an application parameter and an application service volume.

For example, Table 4 shows categories and examples of the application information and the application experience.

TABLE 4

| Category | Example |
| --- | --- |
| Application experience (service experience) | Customer experience index (CEI) of an OTT application, mean opinion score (MOS) of an audio and video application, quality of experience (QoE), or fulfillment ratio of a service level agreement (SLA) |
| Application parameter (service parameters) | Feature of terminal device mobility behavior or feature of terminal device communication behavior of a user when the user uses a communications service |
| Application service volume | Quantity of communication connections or data traffic of an application layer service between terminal devices |

S403: The NWDAF network element receives, from an OAM server, a network KPI of the network slice in the specified location area.

The network KPI may be an overall end-to-end network KPI of the network slice, or may be a network KPI of an NF network element in the network slice. The network KPI may include but is not limited to categories and examples shown in Table 5.

TABLE 5

| Category | Example |
| --- | --- |
| E2E accessibility KPI | Quantity of registered subscribers of a network slice (registered subscribers of network and network slice instance) or registration success rate of a single network slice instance (registration success rate of one single network slice instance) |
| E2E integrity KPI | End-to-end latency of a 5G network, downlink latency in a gNB (downlink latency in gNB), upstream throughput for a network slice instance (upstream throughput for network and network slice instance), downstream throughput for a network slice instance (downstream throughput for single network slice instance), upstream throughput at an N3 interface (upstream throughput at N3 interface), downstream throughput at an N3 interface (downstream throughput at N3 interface), or radio access network user equipment throughput (RAN UE throughput) |
| E2E utilization KPI | Mean quantity of sessions of a network slice instance (mean number of PDU sessions of network and network slice instance) or virtualized resource utilization of a network slice instance (virtualized resource utilization of network slice instance) |
| NF AMF KPI | Mean quantity of registered subscribers (mean number of registered subscribers) or maximum quantity of registered subscribers (maximum number of registered subscribers) |
| NF SMF KPI | Mean quantity of PDU (packet data unit) sessions (number of PDU sessions (mean)) or maximum quantity of PDU sessions (number of PDU sessions (maximum)) |
| NF UPF KPI | Quantity of incoming general packet radio service tunneling protocol data packets at an N3 interface from a radio access network to a UPF (number of incoming GTP data packets on the N3 interface, from (R)AN to UPF), quantity of outgoing general packet radio service tunneling protocol data packets at an N3 interface from a UPF to a radio access network (number of outgoing GTP data packets on the N3 interface, from UPF to (R)AN), quantity of octets of incoming general packet radio service tunneling protocol data packets at an N3 interface from a radio access network to a UPF (number of octets of incoming GTP data packets on the N3 interface, from (R)AN to UPF), |

TABLE 5-continued

| Category | Example |
| --- | --- |
| | quantity of octets of outgoing general packet radio service tunneling protocol data packets at an N3 interface from a UPF to a radio access network (number of incoming GTP data packets on the N3 interface, from UPF to (R)AN), N6 incoming link usage, or N6 outgoing link usage |

For example, the NWDAF network element may send the network KPI of the network slice in the specified location area within the specified time period to the OAM server, and receive the network KPI that is of the network slice in the specified location area within the specified time period and that is sent by the OAM server. For another example, the OAM server may send the network KPI of the OAM server in the specified location area to the NWDAF network element in real time or periodically. This is not limited.

It should be noted that steps S401 and S403 are optional. Example 1: When an association relationship between the application information and network running information in step S405 is an association relationship between the application information and the network parameter, step S403 may not be performed. Further, when the association relationship between the application information and the network parameter is an association relationship between the application parameter and the network parameter, the application information in step S402 may include only the application parameter. When the association relationship between the application information and the network parameter is an association relationship between the application service volume and the network parameter, the application information in step S402 may include only the application service volume. This is not limited.

Example 2: When an association relationship between the application information and network running information in step S405 is an association relationship between the application information and the network KPI, step S401 may not be performed. In addition, for the application information in step S402, refer to related descriptions in Example 1. Details are not described herein again.

S404: The NWDAF network element determines, based on the application information and the application experience of the network slice in the specified location area, a communications service that meets an SLA.

It should be noted that the application information, the application experience, the network KPI, or the network parameter obtained by the NWDAF network element may be a series of sampling values. The sampling value obtained in steps S401 to S403 is a sampling value within a specified time period, or may be a sampling value within an unlimited time period. For details, refer to related descriptions in steps S401 to S403. For example, it is assumed that the obtained sampling value is the sampling value within the specified time period. The application information, the network running information, the application experience, and the like each involved in steps S404 and S405 may be the sampling value within the specified time period. For another example, it is assumed that the obtained sampling value is the sampling value within the unlimited time period. The application information, the network running information, the application experience, and the like each involved in steps S404 and S405 may be the sampling value within the unlimited time period. The sampling value within the unlimited time period may be a sampling value found by the NWDAF network element from the obtained sampling value within a specified time period, or may be an average value of sampling values within a plurality of time periods. This is not limited.

For example, the NWDAF network element analyzes sampling time points of sampling values of the application information, the application experience, the network KPI, and the network parameter, performs association, based on sampling time points at a same time point or similar time points (for example, a slice time difference is less than 5 seconds), on application information sampling value, application experience sampling value, network KPI sampling value, and network parameter sampling value, and performs association, based on communications service-related identifiers (namely, the related identifiers in Table 3) in the network parameter, on the foregoing sampling values and the communications service.

If one communications service serves only one application service, the NWDAF network element may determine, by determining whether application experience of the application service meets the SLA, whether the communications service meets the SLA. For example, if a sampling value of the application experience of the application service is CEI=5 points, and it is required in the SLA that CEI≥3 points, the communications service meets the SLA at the sampling time point. For another example, if it is required in the SLA that a probability of CEI≥3 points is not less than 95%, and 95 or more sampling values of the application experience of the communications service in 100 samples meet CEI≥3 points, the communications service meets the SLA within a time period covered by the 100 samples.

If one communications service serves a plurality (greater than or equal to two) of application services, the NWDAF network element may determine, by determining whether all application experience of the plurality of application service meets the SLA, whether the communications service meets the SLA. The SLA may include requirements that need to be respectively met by the application experience of the plurality of application services, or requirements that need to be met after calculation is performed on the application experience of the plurality of application services. For example, if one communications service serves both a video application and an audio application, and the SLA requires that a point of a video application user be not lower than 3 and a point of an audio application user be not lower than 4, the NWDAF network element determines whether sampling values of the foregoing two types of application experience meet the SLA. If the sampling values of the foregoing two types of application experience meet the SLA, the communications service meets the SLA at the sampling time point. If it is required in the SLA that an average user point of a video application and an audio application is not less than 3.5, the NWDAF network element performs an average calculation on sampling values of the foregoing two types of application experience based on the requirement in the SLA, and then determines whether a calculation result meets the SLA. If the calculation result meets the SLA, the communications service meets the SLA at the sampling time point. Similarly, the NWDAF network element may further determine whether the communications service meets the SLA in time periods covered by several samples.

In step S404, the NWDAF network element may learn of all communications services that meet the SLA in the network slice in the specified location area.

S405: The NWDAF network element determines the association relationship between the application information and the network running information based on the application information and the network running information that correspond to the communications service that meets the SLA and that is provided by the network slice in the specified location area.

Figure 4B:
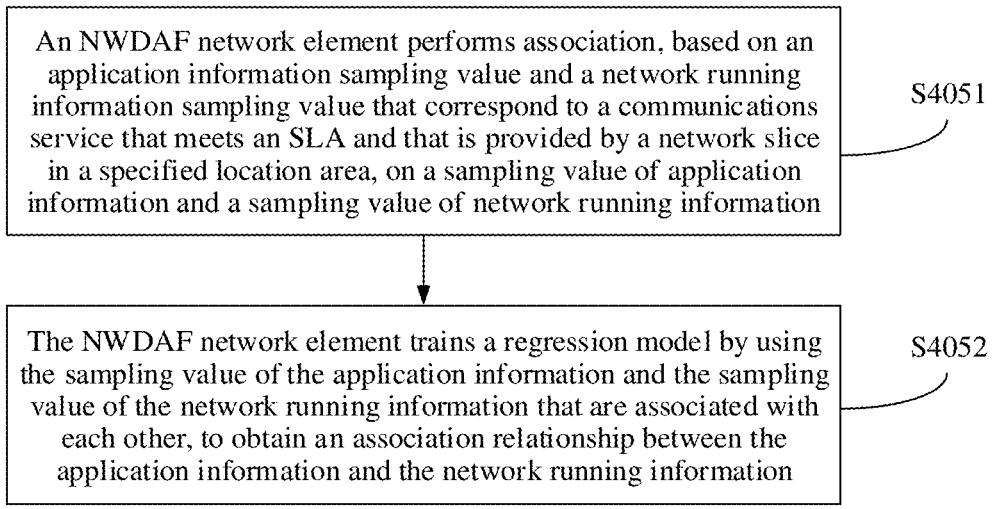
FIG. 4B is a schematic flowchart 7 of a communication method according to an embodiment of this application.

Optionally, as shown in FIG. 4B, step S405 includes steps S4051 and S4052.

S4051: The NWDAF network element performs association, based on the application information sampling value and the network running information sampling value that correspond to the communications service that meets the SLA and that are provided by the network slice in the specified location area, on a sampling value of the application information and a sampling value of the network running information.

As described above, the application information may include the application parameter, and the network running information may include the network parameter. In other words, steps S401 and S402 are performed, and S403 does not need to be performed. In this case, step S4051 may be implemented in Manner 1.

Manner 1: The NWDAF network element performs association on the sampling value of the application information and the sampling value of the network running information based on the application parameter and the network parameter.

For example, it is assumed that the application parameter and the network parameter that are obtained by the NWDAF network element are sampling values corresponding to each communications service provided by the network slice in the specified location area within the specified time period. The NWDAF network element may perform, based on sampling time points of the data and communications services corresponding to the sampling time points, association on the sampling value of the application parameter and the sampling value of the network parameter. For one sampling time point, a numerical vector may be used to represent an associated sampling value, for example, {the sampling value of the application parameter, the sampling value of the network parameter}. For the specified time period, for each sampling time point, a numerical vector may be used to represent an associated sampling value, that is, to obtain a series of numerical vectors {the sampling value of the application parameter, the sampling value of the network parameter}.

As described above, the application information may include the application parameter, and the network running information may include the network KPI. In other words, steps S402 and S403 are performed, and S401 does not need to be performed. In this case, step S4051 may be implemented in Manner 2.

Manner 2: The NWDAF network element performs association on the sampling value of the application information and the sampling value of the network running information based on the application parameter and the network KPI.

Similar to Manner 1, for example, it is assumed that both the application parameter and the network KPI that are obtained by the NWDAF network element are sampling values corresponding to each communications service provided by the network slice in the specified location area within the specified time period. The NWDAF network element may perform, based on sampling time points of the data and communications services corresponding to the sampling time points, association on the sampling value of the application parameter and a sampling value of the network KPI, to obtain a series of numerical vectors {the sampling value of the application parameter, the sampling value of the network KPI} within the specified time period.

As described above, the application information may include the application service volume, and the network running information may include the network KPI. In other words, steps S402 and S403 are performed, and S401 does not need to be performed. In this case, step S4051 may be implemented in Manner 3.

Manner 3: The NWDAF network element performs association on the sampling value of the application information and the sampling value of the network running information based on the application service volume and the network KPI.

Similar to Manner 1, for example, it is assumed that both the application service volume and the network KPI that are obtained by the NWDAF network element are sampling values corresponding to each communications service provided by the network slice in the specified location area within the specified time period. The NWDAF network element may perform, based on sampling time points of the data and communications services corresponding to the sampling time points, association on a sampling value of the application service volume and the sampling value of the network KPI, to obtain a series of numerical vectors {the sampling value of the application service volume, the sampling value of the network KPI} within the specified time period.

As described above, the application information may include the application parameter and the application service volume, and the network running information may include the network KPI. In other words, steps S402 and S403 are performed, and S401 does not need to be performed. In this case, step S4051 may be implemented in Manner 4.

Manner 4: The NWDAF network element performs association on the sampling value of the application parameter, the sampling value of the application service volume, and the sampling value of the network running information based on the application parameter, the application service volume, and the network KPI.

Similar to Manner 1, for example, it is assumed that all the application parameter, the application service volume, and the network KPI that are obtained by the NWDAF network element are sampling values corresponding to each communications service provided by the network slice in the specified location area within the specified time period. The NWDAF network element may perform, based on sampling time points of the data and communications services corresponding to the sampling time points, association on the sampling value of the application parameter, the sampling value of the application service volume, and the sampling value of the network KPI, to obtain a series of numerical vectors {[the sampling value of the application parameter, the sampling value of the application service volume], the sampling value of the network KPI} within the specified time period.

In the foregoing manners, for example, the NWDAF network element performs association on the sampling value of the application information and the sampling value of the network running information that correspond to the communications service that meets the SLA and that is provided by the network slice in the specified location area within the specified time period, to obtain a series of numerical vectors {the sampled value of the application information, the sampled value of the network running information}.

S4052: The NWDAF network element trains a regression model by using the sampling value of the application information and the sampling value of the network running information that are associated with each other, to obtain the association relationship between the application information and the network running information.

The regression algorithm is a supervised learning algorithm, and is used to establish a mapping relationship between an independent variable and a dependent variable. A purpose of the regression algorithm is to find a hypothesis function to best fit a given dataset. Common regression algorithms include linear regression, logistic regression, polynomial regression, and the like. A used regression algorithm is not limited in this application.

The linear regression is used an example. The linear regression algorithm is based on a correlation principle, and the correlation principle is one of basic principles in predictions. A multivariate linear regression model can be used to find out a feature (namely, the independent variable) that may affect the dependent variable, establish a relationship between the independent variable and the dependent variable, and predict the future.

For example, the NWDAF network element trains a linear regression model by using the plurality of numerical vectors {the sampling value of the application parameter, the sampling value of the network parameter} that are obtained in Manner 1 in step S4051. After the training is completed, the regression model may be used to describe an association relationship between an independent variable of the application parameter and a dependent variable of the network parameter. When an independent variable (for example, a value of the application parameter) is input to the regression model, the regression model may output a dependent variable (for example, a value of the network parameter determined based on the foregoing association relationship). Similarly, the NWDAF network element may also train the linear regression model by using the numerical vectors obtained in any one of Manner 2 to Manner 4 in step S4051. When an independent variable (for example, an application information target value) is input to the regression model, the regression model may output a corresponding dependent variable (for example, a network running information target value).

In conclusion, the NWDAF network element trains the regression model by using the numerical vectors obtained in any one of Manner 1 to Manner 4 in step S4051. The trained regression model may be used to describe the association relationship between the application information and the network running information when the communications service provided by the network slice in the specified location area meets the SLA.

S406: An application server management system sends the application information target value to the NWDAF network element by using the OAM server of an operator.

The application information target value is used to describe a change requirement of an application service. The application information target value may be carried in an analytics information request message. The OAM server requests, through this message, the NWDAF network element to provide the network running information target value that can meet the SLA based on the change requirement of the application service.

The application information target value may be an application service parameter target value, or an application service volume target value, or an application parameter target value and an application service volume target value. An expected network running information target value may include a network parameter target value or a network KPI target value.

For example, the target application service volume value may indicate to increase or decrease the application service volume, for example, increasing or decreasing a quantity of application communication connections of a network slice, increasing or decreasing application service traffic of a location area, or adjusting distribution of a service volume of an application of a network slice in different location areas, that is, providing an expected application service volume of the network slice in each location area. The application parameter target value may indicate some application features that are expected to be changed, for example, changing a moving speed requirement of the terminal device, or changing a reliability requirement of the application service.

S407: The NWDAF network element obtains, based on the application information target value and the association relationship between the application information and the network running information, a network running information target value that meets the SLA.

For example, if the NWDAF network element trains the regression model by using the association relationship that is between the application information and the network running information and that is obtained in Manner 1 in step S4051, and the application information target value that is obtained by the NWDAF network element in step S407 is the application parameter target value, the NWDAF network element inputs the application parameter target value as the independent variable into the regression model, to obtain a corresponding network parameter target value as the dependent variable, and uses the network parameter target value as the network running information target value.

For example, if the NWDAF network element trains the regression model by using the association relationship that is between the application information and the network running information and that is obtained in Manner 2 in step S4051, and the application information target value that is obtained by the NWDAF network element in step S407 is the application parameter target value, the NWDAF network element inputs the application parameter target value as the independent variable into the regression model, to obtain a corresponding network KPI target value as the dependent variable, and uses the network KPI target value as the network running information target value.

For example, if the NWDAF network element trains the regression model by using the association relationship that is between the application information and the network running information and that is obtained in Manner 3 in step S4051, and the application information target value that is obtained by the NWDAF network element in step S407 is the target application service volume value, the NWDAF network element inputs the application traffic target value as the independent variable into the regression model, to obtain a corresponding network KPI target value as the dependent variable, and uses the network KPI target value as the network running information target value.

For example, if the NWDAF network element trains the regression model by using the association relationship between the application information and the network running information and that is obtained in Manner 4 in step S4051, and the application information target value that is obtained by the NWDAF network element in step S407 is the application parameter target value and the application service volume target value, the NWDAF network element inputs the application parameter target value and the application service volume target value as two independent variables into the regression model, to obtain corresponding network KPI target values as the dependent variables, and uses the network KPI target value as the network running information target value.

S408: The NWDAF network element sends the network running information target value that meets the SLA to the OAM server.

Correspondingly, the OAM server receives, from the NWDAF network element, the network running information target value that meets the SLA, where the network running information target value may include the network parameter target value or the network KPI target value. The network running information target value may be carried in an analytics information response message.

S409: The OAM server adjusts the network slice based on the network running information target value.

In step S409, the OAM server may configure an NF network element in the network slice based on the network parameter target value. For example, if the network parameter target value indicates that a state parameter of a UPF buffer function is recommended to be an enabled state, the OAM server modifies configuration of the UPF network element to enable the buffer function.

In step S409, the OAM server may adjust a virtual resource of the VNF network element in the network slice based on the network KPI target value. For example, if the network KPI target value indicates a KPI that needs to be met by an NF network element, the OAM server determines a capacity requirement of the VNF network element based on the network KPI target value, and then the OAM server may send a capacity requirement parameter of the VNF network element to the MANO network element on which the VNF network element is deployed, so that the MANO network element adjusts the virtual resource of the VNF network element based on the capacity requirement parameter. The resource adjustment may be reducing or increasing the virtual resource of the VNF network element. This is not limited. For another example, if the OAM server receives a network KPI target value of a network slice, the OAM server sends the network KPI target value to the MANO network element, and the MANO network element may adjust a virtual resource of a VNF network element in the network slice according to a preconfigured scaling-out/scaling-in policy of the virtual resource and based on the network KPI target value.

It should be noted that the scaling-out/scaling-in policy may be a rule preconfigured by the operator for each VNF network element. The rule may include a rule used to indicate that a network KPI triggers virtual resource scaling-out/scaling-in on a VNF network element. The rule may further include: different deployment flavors (DF) of a network service descriptor (NSD) or a virtualized network function descriptor (VNFD) that corresponds to different ranges of a network KPI value, different DFs of a VNFD that corresponds to different network KPI values of an NF network element in a location area, different DFs of a VNFD that corresponds to a function feature parameter of an NF network element or an area traffic capacity parameter of an NF network element in a location area, or the like.

According to the communication method provided in this embodiment of this application, the NWDAF network element obtains the association relationship between the application information and the network running information based on the network parameter that corresponds to the communications service provided by the network slice in the specified location area and other related information. The NWDAF network element obtains the application information target value from the application server management system, obtains the network running information target value based on the association relationship between the application information and the network running information and the application information target value, and sends the network running information target value to the OAM server, so that the OAM server can dynamically adjust the network slice based on the network running information target value, and the network slice can respond to a dynamic change of a service feature or a performance requirement of an application service in a timely manner.

Figure 5:
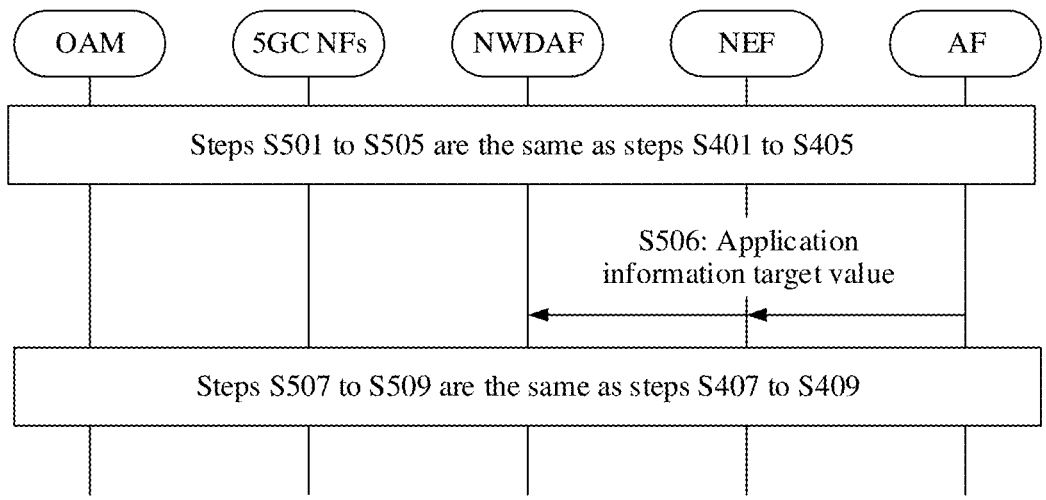
FIG. 5 is a schematic flowchart 8 of a communication method according to an embodiment of this application.

As shown in FIG. 5, an embodiment of this application provides another communication method. The method may be applied to a scenario in which an AF network element sends an application information target value to an NWDAF network element. The communication method may include steps S501 to S509. Steps S501 to S505 are the same as steps S401 to S405, and steps S507 to S509 are the same as steps S407 to S409. Details are not described herein again.

S506: An application server sends the application information target value to the NWDAF network element by using the AF network element.

Optionally, the application server sends the application information target value to the NWDAF network element by using the AF network element and an NEF network element.

Correspondingly, the NWDAF network element receives the application information target value from the application server by using the AF network element.

For description of the application information target value, refer to step S406. Details are not described herein again.

According to the communication method provided in this embodiment of this application, the NWDAF network element obtains the association relationship between the application information and the network running information based on the network parameter that corresponds to the communications service provided by the network slice in the specified location area and other related information. The NWDAF network element obtains the application information target value from the AF network element, obtains a network running information target value based on the association relationship between the application information and the network running information and the application information target value, and sends the network running information target value to the OAM server, so that the OAM server dynamically adjusts the network slice based on the network running information target value, and the network slice can respond to a dynamic change of a service feature or a performance requirement of an application service in a timely manner.

Figure 6:
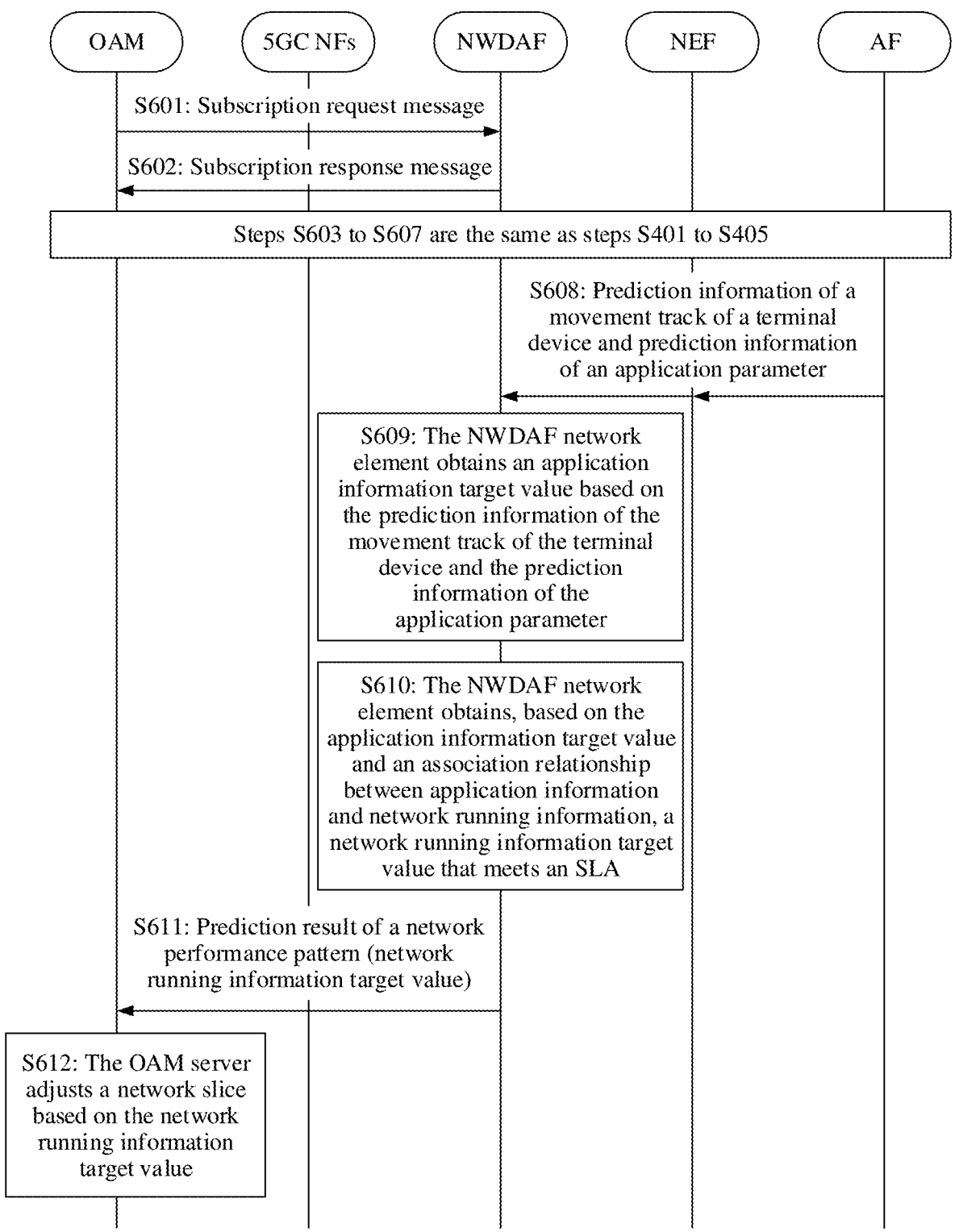
FIG. 6 is a schematic flowchart 9 of a communication method according to an embodiment of this application.

As shown in FIG. 6, an embodiment of this application provides another communication method. The method may be applied to a scenario in which an OAM server subscribes to a network running information target value from an NWDAF network element, where the network running information target value is generated by the NWDAF network element based on prediction information of a movement track of a terminal device and prediction information of an application parameter that are received from an AF network element. The communication method may include steps S601 to S612.

S601: The OAM server sends a subscription request message to the NWDAF network element.

The subscription request message may be used to request to subscribe to a prediction result of a network performance pattern (NW performance pattern) from the NWDAF network element.

For example, the network performance pattern is network load information (load in a network area) of a specified location area. The load information may be described by using a network KPI or an NF network element KPI. For example, the prediction result that is of the network performance pattern and that is subscribed by the OAM server from the NWDAF network element may be described by using a network KPI target value of each location area.

Optionally, the subscription request message may further include: advance prediction duration, a time interval for performing prediction each time, and an event notification manner (for example, a periodic notification or a condition-triggered notification).

If the event notification manner is the periodic notification, the NWDAF network element sends a notification message to the OAM server each time after generating the prediction result of the network performance pattern. The notification message includes the prediction result of the network performance pattern from the NWDAF network element.

If the event notification manner is the condition-triggered notification, the OAM server specifies a preset trigger condition in the subscription request message. When the preset trigger condition is met, the NWDAF network element sends a notification message to the OAM server. The notification message includes the prediction result of the network performance pattern from the NWDAF network element.

For example, the condition of the condition-triggered notification may be that a change of a current predicted value in a load change range relative to a specified value is greater than a preset threshold (for example, a percentage of the predicted value greater than or less than the specified value exceeds 30%), may be that a change rate of a current predicted value in a load change range relative to a current measured data or a previous predicted value exceeds a preset threshold (for example, 30%), or the like.

S602: The NWDAF network element sends a subscription response message to the OAM server.

Steps S603 to S607 are the same as steps S401 to S405, and details are not described herein again. It should be noted that the NWDAF network element may train a regression model in step S607. For a description of the regression model, refer to step S405. Details are not described herein again.

S608: The AF network element sends the prediction information of the movement track of the terminal device and the prediction information of the application parameter to the NWDAF network element by using an NEF network element.

Correspondingly, the NWDAF network element receives the prediction information of the movement track of the terminal device and prediction information of the application parameter from the AF network element.

For the prediction information of the movement track of the terminal device and the prediction information of the application parameter, refer to the foregoing description. Details are not described herein again.

S609: The NWDAF network element obtains an application information target value based on the prediction information of the movement track of the terminal device and the prediction information of the application parameter.

The NWDAF network element may predict, based on a parameter that is of a mobility behavior feature of the terminal device and that is in the prediction information of the application parameter, a mobility pattern used by the terminal device. The NWDAF network element may predict, based on a parameter that is of a communication behavior feature of the terminal device and that is in the prediction information of the application parameter, a communication pattern used by the terminal device. The prediction information of the application parameter may be for one terminal device or one group of terminal devices. Correspondingly, the NWDAF network element may predict a mobility pattern or a communication pattern used by one terminal device, or may predict a mobility pattern or a communication pattern used by one group of terminal devices.

Further, the NWDAF network element may estimate, based on the prediction information of the movement track of the terminal device and the predicted mobility pattern used by the terminal device, a time at which the mobile terminal arrives at the specified location area. After the foregoing estimation is performed on the one group of terminal devices, the NWDAF network element may further predict a quantity of terminal devices in a specified location area at a time point. The NWDAF network element may obtain a predicted value of an application service volume in the specified location area at the time point based on the predicted quantity of terminal devices in the specified location area at the time point and a predicted communication pattern used by the terminal device, and use the predicted value of the application service volume as the application information target value.

S610: The NWDAF network element obtains, based on the application information target value and the association relationship between the application information and the network running information, a network running information target value that meets the SLA.

Step S610 is the same as step S407, and details are not described herein again.

S611: The NWDAF network element sends the prediction result of the network performance pattern to the OAM server.

The prediction result of the network performance pattern includes the network running information target value that meets the SLA.

If the event notification manner subscribed to by the OAM server in step S601 is the periodic notification, after generating the prediction result of the network performance pattern, the NWDAF network element sends the prediction result to the OAM server by using an event subscription notification message. If the event notification manner subscribed to by the OAM server is condition-triggered notification, the NWDAF network element compares a currently generated prediction result of the network performance pattern with a value specified in the preset trigger condition in the subscription request message, compares a currently generated prediction result of the network performance pattern with a previous generated prediction result of the network performance pattern, or compares a currently generated prediction result with the network KPI received in step S605. If the currently generated prediction result of the network performance pattern exceeds a preset threshold, the currently generated prediction result of the network performance pattern is sent to the OAM server by using the event subscription notification message. If the currently generated prediction result of the network performance pattern does not exceed the preset threshold, only the currently generated prediction result of the network performance pattern is cached, and the event subscription notification message is not sent.

S612: The OAM server adjusts the network slice based on the network running information target value.

This step is the same as S409, and details are not described herein again.

According to the communication method provided in this embodiment of this application, the NWDAF network element trains the regression model to obtain the association relationship between the application information and the network running information. The NWDAF network element obtains the prediction information of the movement track of the terminal device and the prediction information of the application parameter from the AF network element, and obtains the application information target value based on the prediction information of the movement track of the terminal device and the prediction information of the application parameter. The NWDAF network element obtains the network running information target value based on the association relationship between the application information and the network running information and the application information target value, and sends the network running information target value to the OAM server, so that the OAM server can adjust a network based on the prediction information of the movement track of the terminal device and the prediction information of the application parameter, to better adapt to an expected change of an application service.

An embodiment of this application further provides a communications apparatus. The communications apparatus may be configured to perform a function of the NWDAF network element in the foregoing method. In the embodiments of this application, the communications apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this application, division into the modules is an example, and is merely logical function division. In actual implementation, another division manner may be used.

Figure 7:
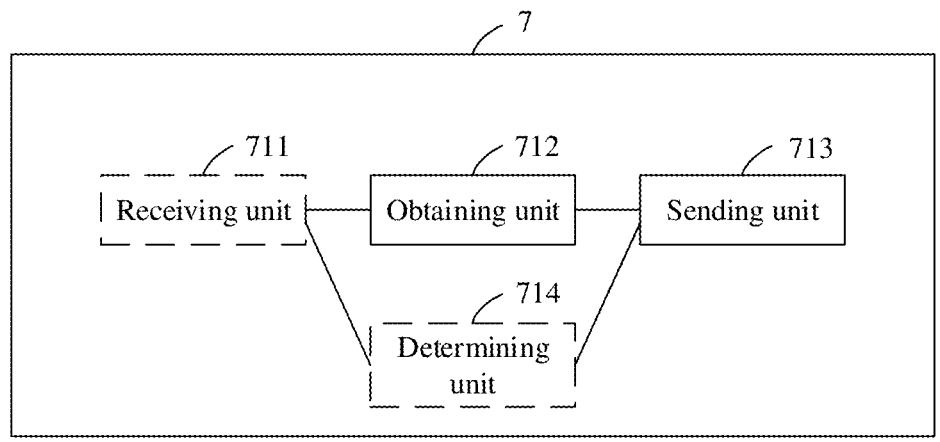
FIG. 7 is a schematic structural diagram 2 of a communications apparatus according to an embodiment of this application.

When each functional module is obtained through division based on each corresponding function, FIG. 7 is a possible schematic structural diagram of the communications apparatus in the foregoing embodiment. A communications apparatus 7 may include a receiving unit 711, an obtaining unit 712, a sending unit 713, and a determining unit 714. The foregoing units are configured to support the communications apparatus in performing the related method performed by the NWDAF network element in any one of the accompanying drawings in FIG. 3A to FIG. 6.

The communications apparatus provided in this application is configured to perform the corresponding method provided above. Therefore, for corresponding features and beneficial effects that can be achieved by the communications apparatus, refer to the beneficial effects in the corresponding method provided above. Details are not described herein again.

It should be noted that the foregoing units are optional. For example, the communications apparatus 7 may include the obtaining unit 712 and the sending unit 713. Optionally, the communications apparatus 7 may further include the receiving unit 711, and optionally, may further include the determining unit 714.

For example, the receiving unit 711 is configured to support the communications apparatus 7 in performing the process S305 in FIG. 3B, the processes S305, S307, and S308 in FIG. 3C, the processes S305, S309, and S310 in FIG. 3D, the processes S305, S311, and S312 in FIG. 3E, the processes S401 to S403 and S406 in FIG. 4A-1 and FIG. 4A-2, the processes S501 to S503 and S506 in FIG. 5, or the processes S601, S603 to S605, and S608 in FIG. 6. The obtaining unit 712 is configured to support the communications apparatus 7 in performing the processes S301 and S302 in FIG. 3A, the processes S301 and S302 in FIG. 3B, the processes S301 and S302 in FIG. 3C, the processes S301 and S302 in FIG. 3D, the processes S301 and S302 in FIG. 3E, the process S407 in FIG. 4A-1 and FIG. 4A-2, the processes S4051 and S4052 in FIG. 4B, the process S507 in FIG. 5, or the processes S609 and S610 in FIG. 6. The sending unit 713 is configured to support the communications apparatus 7 in performing the process S303 in FIG. 3A, the process S303 in FIG. 3B, the process S303 in FIG. 3C, the process S303 in FIG. 3D, the process S303 in FIG. 3E, the process S408 in FIG. 4A-1 and FIG. 4A-2, the process S508 in FIG. 5, or the process S611 in FIG. 6. The determining unit 714 is configured to support the communications apparatus 7 in performing the processes S304 and S306 in FIG. 3B, the processes S306 and S3041 in FIG. 3C, the processes S306 and S3042 in FIG. 3D, the processes S306 and S3043 in FIG. 3E, the processes S404 and S405 in FIG. 4A-1 and FIG. 4A-2, the processes S504 and S505 in FIG. 5, or the processes S606 and S607 in FIG. 6. All related content of the steps in the foregoing method embodiments may be cited in function descriptions of corresponding functional modules. Details are not described herein again.

In a possible implementation, the communications apparatus includes:
the obtaining unit 712, configured to obtain an application information target value of a network slice in a specified location area, where
the obtaining unit 712 is further configured to obtain a network running information target value of the network slice in the specified location area based on an association relationship between application information and network running information and the application information target value, where the association relationship is used to describe an association relationship between application information and network running information when a communications service provided by the network slice in the specified location area meets a service level agreement SLA; and
the sending unit 713, configured to send the network running information target value to an operation, administration, and maintenance server.

In a possible implementation, the application information target value includes an application parameter target value, and the network running information target value includes a network parameter target value; the application information target value includes an application parameter target value, and the network running information target value includes a network key performance indicator KPI target value; or the application information target value includes an application service volume target value, and the network running information target value includes a network KPI target value.

In a possible implementation, the communications apparatus further includes the receiving unit 711, configured to receive the application information target value from the operation, administration, and maintenance server or an application function network element.

In a possible implementation, the communications apparatus further includes the receiving unit 711;
the receiving unit 711 is configured to receive prediction information of a movement track of a terminal device and prediction information of an application parameter from an application function network element, where the prediction information of the application parameter is used to predict a mobility pattern and/or a communication pattern used by the terminal device; and the obtaining unit 712 is configured to obtain the application information target value based on the prediction information of the movement track of the terminal device and the prediction information of the application parameter.

In a possible implementation, the communications apparatus further includes the determining unit 714, configured to determine the association relationship based on the application information and the network running information that correspond to the communications service that meets the SLA and that is provided by the network slice in the specified location area.

In a possible implementation, the communications apparatus further includes the receiving unit 711;
the receiving unit 711 is configured to receive application experience of the network slice in the specified location area from the application function network element; and
the determining unit 714 is configured to determine, based on the application experience, the communications service that meets the SLA.

In a possible implementation, the communications apparatus further includes the receiving unit 711;
the receiving unit 711 is configured to receive, from the application function network element, an application parameter that corresponds to the communications service that meets the SLA and that is provided by the network slice in the specified location area;
the receiving unit 711 is configured to receive, from a network function network element in the network slice, a network parameter that corresponds to the communications service that meets the SLA and that is provided by the network slice in the specified location area; and
the determining unit 714 is configured to determine the association relationship based on the application parameter and the network parameter.

In a possible implementation, the communications apparatus further includes the receiving unit 711;
the receiving unit 711 is configured to receive, from the application function network element, an application service volume of the communications service that meets the SLA and that is provided by the network slice in the specified location area;
the receiving unit 711 is configured to receive, from the operation, administration, and maintenance server, a network KPI of the communications service that meets the SLA and that is provided by the network slice in the specified location area; and
the determining unit 714 is configured to determine the association relationship based on the application service volume and the network KPI.

In a possible implementation, the communications apparatus further includes the receiving unit 711;
the receiving unit 711 is configured to receive, from the application function network element, an application parameter of the communications service that meets the SLA and that is provided by the network slice in the specified location area;
the receiving unit 711 is configured to receive, from the operation, administration, and maintenance server, a network KPI of the communications service that meets the SLA and that is provided by the network slice in the specified location area; and
the determining unit 714 is configured to determine the association relationship based on the application parameter and the network KPI.

In a possible implementation, the specified location area is an entire area in which the network slice provides a service or a partial location area in which the network slice provides a service.

Figure 8:
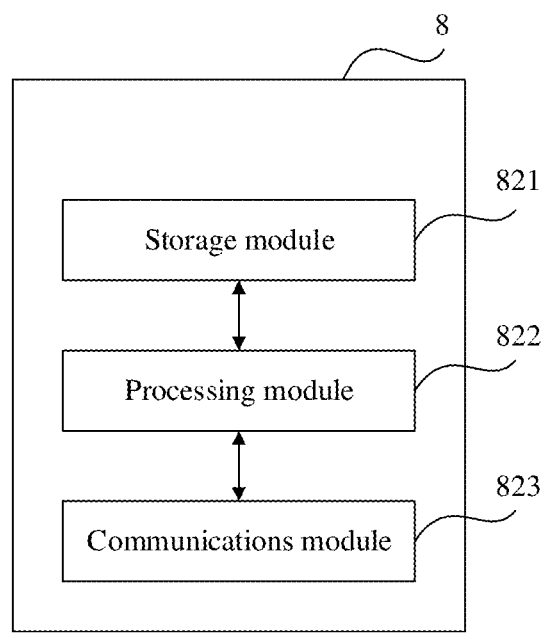
FIG. 8 is a schematic structural diagram 3 of a communications apparatus according to an embodiment of this application.

FIG. 8 is still another possible schematic structural diagram of the communications apparatus in the foregoing embodiments. A communications apparatus 8 includes a processing module 822 and a communications module 823. Optionally, the communications apparatus 8 may further include a storage module 821. The foregoing modules are configured to support the communications apparatus in performing the related method performed by the NWDAF network element in any one of the accompanying drawings in FIG. 3A to FIG. 6.

The communications apparatus provided in this application is configured to perform the corresponding method provided above. Therefore, for corresponding features and beneficial effects that can be achieved by the communications apparatus, refer to the beneficial effects in the corresponding method provided above. Details are not described herein again.

In a possible manner, the processing module 822 is configured to control and manage an action of the communications apparatus 8 or perform a corresponding processing function, for example, perform functions of the obtaining unit 712 and the determining unit 714. The communications module 823 is configured to support the communications apparatus 8 in performing functions of the receiving unit 711 and the sending unit 713. The storage module 821 is configured to store program code and/or data of the communications apparatus.

The processing module 822 may be a processor or a controller, for example, a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processing module 822 may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 823 may be a network interface, a communications interface, or the like. The storage module 821 may be a memory.

In a possible manner, the processing module 822 may be the processor 201 in FIG. 2, the communications module 823 may be the communications interface 204 in FIG. 2, and the storage module 821 may be the memory 203 in FIG. 2. One or more programs are stored in the memory. The one or more programs include an instruction. When the instruction is executed by the communications apparatus, the communications apparatus is enabled to perform the related method performed by the NWDAF network element in any one of the accompanying drawings in FIG. 3A to FIG. 6.

An embodiment of this application further provides a computer storage medium that stores one or more programs. The computer storage medium stores a computer program. When the computer program is executed by a processor, a communications apparatus is enabled to perform the related method performed by the NWDAF network element in any one of the accompanying drawings in FIG. 3A to FIG. 6.

An embodiment of this application further provides a computer program product including an instruction. When the computer program product runs on a communications apparatus, the communications apparatus is enabled to perform the related method performed by the NWDAF network element in any one of the accompanying drawings in FIG. 3A to FIG. 6.

An embodiment of this application provides a chip system. The chip system includes a processor, configured to support a communications apparatus to perform the related method performed by the NWDAF network element in any one of the accompanying drawings in FIG. 3A to FIG. 6. For example, a network data analytics function network element obtains an application information target value of a network slice in a specified location area. The network data analytics function network element obtains a network running information target value of the network slice in the specified location area based on an association relationship between application information and network running information and the application information target value. The association relationship is used to describe an association relationship between application information and network running information when a communications service provided by the network slice in the specified location area meets a service level agreement SLA. The network data analytics function network element sends the network running information target value to an operation, administration, and maintenance server. In a possible implementation, the chip system further includes a memory, and the memory is configured to store a necessary program instruction and data. The chip system may include a chip and an integrated circuit, or may include a chip and another discrete device. This is not specifically limited in this embodiment of this application.

The communications apparatus, the computer storage medium, the computer program product, or the chip system provided in this application is configured to perform the corresponding method provided above. Therefore, for beneficial effects that can be achieved, refer to the beneficial effects in the corresponding method provided above. Details are not described herein again.

It may be understood that the communications apparatus may be an NWDAF network element, or may be a component (a chip, a circuit, or the like) that can be used for an NWDAF network element.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, device, and method may be implemented in other manners. For example, the described device embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When a software program is used to implement the embodiments, the embodiments may be implemented entirely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   obtaining, by a network data analytics function network element, an application information target value of a network slice in a specified location area;
   obtaining, by the network data analytics function network element, a network running information target value of the network slice in the specified location area based on an association relationship between application information and network running information and the application information target value, wherein the association relationship is used to describe the association relationship between the application information and the network running information when a communications service provided by the network slice in the specified location area meets a service level agreement (SLA); and
   sending, by the network data analytics function network element, the network running information target value to an operation, administration, and maintenance server.

2. The communication method according to claim 1, wherein the application information target value comprises an application parameter target value, and the network running information target value comprises a network parameter target value;
   the application information target value comprises an application parameter target value, and the network running information target value comprises a network key performance indicator (KPI) target value; or
   the application information target value comprises an application service volume target value, and the network running information target value comprises a network KPI target value.

3. The communication method according to claim 1, wherein the obtaining, by the network data analytics function network element, the application information target value of the network slice in the specified location area comprises:
   receiving, by the network data analytics function network element, the application information target value from the operation, administration, and maintenance server or an application function network element.

4. The communication method according to claim 1, wherein the obtaining, by the network data analytics function network element, the application information target value of the network slice in the specified location area comprises:
   receiving, by the network data analytics function network element, prediction information of a movement track of a terminal device and prediction information of an application parameter from an application function network element, wherein the prediction information of the application parameter is used to predict a mobility pattern and/or a communication pattern used by the terminal device; and
   obtaining, by the network data analytics function network element, the application information target value based on the prediction information of the movement track of the terminal device and the prediction information of the application parameter.

5. The communication method according to claim 1, wherein the communication method further comprises:
   determining, by the network data analytics function network element, the association relationship based on the application information and the network running information that correspond to the communications service that meets the SLA and that is provided by the network slice in the specified location area.

6. The communication method according to claim 5, wherein the communication method further comprises:
- receiving, by the network data analytics function network element, application experience of the network slice in the specified location area from the application function network element; and
- determining, by the network data analytics function network element based on the application experience, the communications service that meets the SLA.

7. The communication method according to claim 5, wherein the communication method further comprises:
- receiving, by the network data analytics function network element from the application function network element, an application parameter that corresponds to the communications service that meets the SLA and that is provided by the network slice in the specified location area; and
- receiving, by the network data analytics function network element from a network function network element in the network slice, a network parameter that corresponds to the communications service that meets the SLA and that is provided by the network slice in the specified location area; and
- the determining, by the network data analytics function network element, the association relationship based on the application information and the network running information that correspond to the communications service that meets the SLA and that is provided by the network slice in the specified location area comprises:
  - determining, by the network data analytics function network element, the association relationship based on the application parameter and the network parameter.

8. The communication method according to claim 5, wherein the communication method further comprises:
- receiving, by the network data analytics function network element from the application function network element, an application service volume of the communications service that meets the SLA and that is provided by the network slice in the specified location area; and
- receiving, by the network data analytics function network element from the operation, administration, and maintenance server, a network key performance indicator (KPI) of the communications service that meets the SLA and that is provided by the network slice in the specified location area; and
- the determining, by the network data analytics function network element, the association relationship based on the application information and the network running information that correspond to the communications service that meets the SLA and that is provided by the network slice in the specified location area comprises:
  - determining, by the network data analytics function network element, the association relationship based on the application service volume and the network KPI.

9. The communication method according to claim 5, wherein the communication method further comprises:
- receiving, by the network data analytics function network element from the application function network element, an application parameter of the communications service that meets the SLA and that is provided by the network slice in the specified location area; and
- receiving, by the network data analytics function network element from the operation, administration, and maintenance server, a network key performance indicator (KPI) of the communications service that meets the SLA and that is provided by the network slice in the specified location area; and
- the determining, by the network data analytics function network element, the association relationship based on the application information and the network running information that correspond to the communications service that meets the SLA and that is provided by the network slice in the specified location area comprises:
  - determining, by the network data analytics function network element, the association relationship based on the application parameter and the network KPI.

10. The communication method according to claim 1, wherein the specified location area is an entire area in which the network slice provides a service or a partial location area in which the network slice provides a service.

11. The communication method according to claim 1, wherein the method further comprises:
- receiving, by the operation, administration, and maintenance server the network running information target value.

12. A communications apparatus, comprising: a processor and a memory; wherein
- the memory is configured to store a program; and
- the processor invokes the program stored in the memory, to perform the following method:
  - obtaining an application information target value of a network slice in a specified location area;
  - obtaining a network running information target value of the network slice in the specified location area based on an association relationship between application information and network running information and the application information target value, wherein the association relationship is used to describe the association relationship between the application information and the network running information when a communications service provided by the network slice in the specified location area meets a service level agreement SLA meets a service level agreement (SLA); and
  - sending the network running information target value to an operation, administration, and maintenance server.

13. The communications apparatus according to claim 12, wherein the application information target value comprises an application parameter target value, and the network running information target value comprises a network parameter target value;
- the application information target value comprises an application parameter target value, and the network running information target value comprises a network key performance indicator (KPI) target value; or
- the application information target value comprises an application service volume target value, and the network running information target value comprises a network KPI target value.

14. The communications apparatus according to claim 12, wherein the processor is further configured to receive the application information target value from the operation, administration, and maintenance server or an application function network element.

15. The communications apparatus according to claim 12, wherein the processor is further configured to receive prediction information of a movement track of a terminal device and prediction information of an application parameter from an application function network element, wherein the prediction information of the application parameter is used to predict a mobility pattern and/or a communication pattern used by the terminal device; and obtain the application information target value based on the prediction information of the movement track of the terminal device and the prediction information of the application parameter.

16. The communications apparatus according to claim 12, wherein the processor is further configured to determine the association relationship based on the application information and the network running information that correspond to the communications service that meets the SLA and that is provided by the network slice in the specified location area.

17. The communications apparatus according to claim 16, wherein the processor is further configured to:
receive application experience of the network slice in the specified location area from the application function network element; and
determine, based on the application experience, the communications service that meets the SLA.

18. The communications apparatus according to claim 16, wherein the processor is further configured to:
receive, from the application function network element, an application parameter that corresponds to the communications service that meets the SLA and that is provided by the network slice in the specified location area;
receive, from a network function network element in the network slice, a network parameter that corresponds to the communications service that meets the SLA and that is provided by the network slice in the specified location area; and
determine the association relationship based on the application parameter and the network parameter.

19. The communications apparatus according to claim 16, wherein the processor is further configured to:
receive, from the application function network element, an application service volume of the communications service that meets the SLA and that is provided by the network slice in the specified location area;
receive, from the operation, administration, and maintenance server, a network KPI of the communications service that meets the SLA and that is provided by the network slice in the specified location area; and
determine the association relationship based on the application service volume and the network KPI.

20. A communications system, comprising: a network data analytics function network element, and an operation, administration, and maintenance server; wherein
the network data analytics function network element is configured to:
obtain an application information target value of a network slice in a specified location area;
obtain a network running information target value of the network slice in the specified location area based on the association relationship between the application information and the network running information and the application information target value, wherein the association relationship is used to describe an association relationship between application information and network running information when a communications service provided by the network slice in the specified location area meets a service level agreement (SLA); and
send the network running information target value to an operation, administration, and maintenance server; and
the operation, administration, and maintenance server is configured to receive the network running information target value.

* * * * *